(12) United States Patent
Florissi et al.

(10) Patent No.: US 7,546,609 B2
(45) Date of Patent: Jun. 9, 2009

(54) METHOD AND APPARATUS FOR DETERMINING MONITORING LOCATIONS IN DISTRIBUTED SYSTEMS

(75) Inventors: Danilo Florissi, Briarcliff Manor, NY (US); Patricia Gomes Soares Florissi, Briarcliff Manor, NY (US); Udi Kleers, Elmsford, NY (US); Shmuel Kliger, Chappaqua, NY (US); Eyal Yardeni, Ardsley, NY (US); Yechiam Yemini, Cos Cob, CT (US)

(73) Assignee: EMC Corporation, Hopkinton, MA (US)

( * ) Notice: Subject to any disclaimer, the term of this patent is extended or adjusted under 35 U.S.C. 154(b) by 1014 days.

(21) Appl. No.: 11/077,933

(22) Filed: Mar. 11, 2005

(65) Prior Publication Data
US 2005/0210133 A1    Sep. 22, 2005

Related U.S. Application Data

(60) Provisional application No. 60/552,559, filed on Mar. 12, 2004.

(51) Int. Cl.
*G06F 13/00* (2006.01)
(52) U.S. Cl. .................. 719/318; 709/223; 709/224
(58) Field of Classification Search ............. 719/318; 709/223, 224; 702/181, 183, 185, 196
See application file for complete search history.

(56) References Cited

U.S. PATENT DOCUMENTS

| | | | |
|---|---|---|---|
| 5,528,516 A | 6/1996 | Yemini | |
| 5,661,668 A | 8/1997 | Yemini | |
| 6,249,755 B1 | 6/2001 | Yemini | |
| 6,868,367 B2 * | 3/2005 | Yemini et al. | 702/183 |
| 7,464,147 B1 * | 12/2008 | Fakhouri et al. | 709/223 |
| 2004/0010716 A1 * | 1/2004 | Childress et al. | 713/201 |

* cited by examiner

*Primary Examiner*—Andy Ho
(74) *Attorney, Agent, or Firm*—Krishnendu Gupta; Joseph D'Angelo

(57) ABSTRACT

A method and apparatus for determining the number and location of monitoring entities in a distributed system is disclosed. The method comprising the steps of automatically generating a causality mapping model of the dependences between causing events at the nodes of the distributed system and the detectable events associated with a subset of the nodes, the model suitable for representing the execution of at least one system operation, reducing the number of detectable events in the model, wherein the reduced number of detectable events is suitable for substantially representing the execution of the at least one system operation; and placing at least one of the at least one monitoring entities at selected ones of the nodes associated with the detectable events in the reduced model. In another aspect, the processing described herein is in the form of a computer-readable medium suitable for providing instruction to a computer or processing system for executing the processing claimed.

42 Claims, 18 Drawing Sheets

| | CONNECTION | | | | | | | | | | | | | | | |
|---|---|---|---|---|---|---|---|---|---|---|---|---|---|---|---|---|
| | 01/12 | 02/06 | 02/07 | 03/04 | 03/06 | 04/06 | 04/09 | 04/12 | 06/07 | 06/09 | 06/11 | 06/12 | 07/11 | 07/12 | 09/10 | 09/11 |
| E01 | 1 | 1 | 1 | 1 |   | 1 | 1 | 1 |   |   |   |   |   |   |   |   |
| E02 | 1 | 1 | 1 | 1 | 1 |   |   |   |   |   |   |   |   |   |   |   |
| E03 |   | 1 | 1 | 1 | 1 | 1 |   |   | 1 | 1 | 1 | 1 |   |   |   |   |
| E04 | 1 |   | 1 | 1 |   | 1 | 1 | 1 | 1 |   |   |   | 1 | 1 |   |   |
| E06 |   | 1 |   | 1 | 1 | 1 | 1 |   | 1 | 1 | 1 | 1 |   |   | 1 | 1 |
| E07 |   |   | 1 | 1 |   | 1 | 1 | 1 | 1 |   |   |   | 1 | 1 | 1 | 1 |
| E09 | 1 | 1 |   |   | 1 | 1 | 1 | 1 | 1 | 1 | 1 | 1 | 1 | 1 | 1 | 1 |
| E10 |   |   | 1 |   |   |   |   |   | 1 |   | 1 | 1 | 1 | 1 | 1 | 1 |
| E11 | 1 |   |   |   | 1 |   | 1 |   |   | 1 | 1 | 1 | 1 | 1 | 1 | 1 |
| E12 | 1 |   |   |   | 1 | 1 | 1 |   | 1 |   | 1 | 1 | 1 | 1 | 1 | 1 |
| R01 | 1 | 1 | 1 | 1 | 1 | 1 | 1 | 1 | 1 |   |   |   | 1 | 1 |   |   |
| R02 | 1 | 1 | 1 | 1 | 1 | 1 | 1 | 1 |   | 1 | 1 | 1 |   |   |   |   |
| R03 | 1 | 1 | 1 | 1 | 1 | 1 | 1 | 1 | 1 | 1 | 1 | 1 |   |   | 1 | 1 |
| R04 | 1 | 1 | 1 |   | 1 | 1 |   | 1 | 1 | 1 |   |   | 1 | 1 | 1 |   |
| R05 | 1 | 1 | 1 | 1 | 1 |   |   |   |   |   | 1 |   | 1 |   |   | 1 |
| R06 | 1 | 1 | 1 | 1 | 1 | 1 | 1 | 1 | 1 | 1 |   | 1 |   |   | 1 | 1 |
| R07 | 1 |   | 1 | 1 |   | 1 | 1 |   | 1 | 1 |   |   | 1 | 1 | 1 | 1 |
| R08 | 1 | 1 | 1 |   |   | 1 |   |   | 1 |   |   | 1 | 1 | 1 | 1 | 1 |
| R09 | 1 | 1 |   | 1 | 1 | 1 | 1 | 1 |   | 1 |   |   | 1 | 1 | 1 | 1 |
| R10 | 1 |   | 1 | 1 | 1 | 1 | 1 | 1 | 1 |   | 1 | 1 | 1 | 1 | 1 | 1 |
| R11 | 1 |   | 1 | 1 |   | 1 | 1 | 1 | 1 | 1 |   | 1 | 1 | 1 | 1 | 1 |
| R12 | 1 | 1 |   |   | 1 | 1 | 1 | 1 | 1 |   | 1 | 1 | 1 | 1 | 1 | 1 |

| | CONNECTION | | | | | |
|---|---|---|---|---|---|---|
| | 02/03 | 03/12 | 05/09 | 06/12 | 07/12 | 10/12 |
| E01 | 13 | | | | | |
| E02 | 100 | 13 | | | | |
| E03 | 100 | 100 | 13 | 13 | | |
| E04 | | | | | 13 | |
| E06 | 13 | 13 | 100 | 100 | | |
| E07 | | | | | 100 | 13 |
| E09 | | 13 | 100 | 23 | 13 | 13 |
| E10 | | | | | 13 | 100 |
| E11 | | 13 | | 13 | 13 | 23 |
| E12 | | 100 | 13 | 100 | 100 | 100 |
| R01 | 77 | 13 | | | 13 | |
| R02 | 100 | 74 | 13 | 13 | | |
| R03 | 100 | 98 | 74 | 71 | | |
| R04 | 13 | | | | 71 | 13 |
| R05 | 74 | 13 | | | | |
| R06 | 74 | 74 | 99 | 98 | 13 | 23 |
| R07 | | | | | 98 | 71 |
| R08 | 13 | 13 | | 13 | 13 | 13 |
| R09 | 13 | 74 | 99 | 91 | 71 | 71 |
| R10 | | 13 | | | 13 | 98 |
| R11 | | 74 | 13 | 71 | 77 | 93 |
| R12 | | 98 | 74 | 98 | 98 | 98 |

FIG. 8A

| | CONNECTION | | | | | | | | | |
|---|---|---|---|---|---|---|---|---|---|---|
| | E01 | E02 | E03 | E04 | E06 | E07 | E09 | E10 | E11 | E12 |
| E01 | 1 | 1 | | 1 | | | | | | |
| E02 | 1 | 1 | 1 | | | | | | | |
| E03 | | 1 | 1 | 1 | 1 | | | | | |
| E04 | 1 | | 1 | | 1 | 1 | | | | |
| E06 | | | 1 | 1 | | 1 | 1 | | | |
| E07 | | | | 1 | | 1 | 1 | 1 | | |
| E09 | | | | | 1 | | 1 | | | 1 |
| E10 | | | | | | 1 | | 1 | 1 | 1 |
| E11 | | | | | | | | 1 | 1 | 1 |
| E12 | | | | | | 1 | | | 1 | 1 |
| R01 | 1 | 1 | 1 | 1 | 1 | | | | | |
| R02 | 1 | 1 | 1 | 1 | | 1 | 1 | | | |
| R03 | 1 | 1 | 1 | | 1 | | 1 | | | |
| R04 | 1 | 1 | | 1 | | 1 | | 1 | | |
| R05 | 1 | 1 | 1 | | | | | | 1 | |
| R06 | | 1 | 1 | | 1 | 1 | | | | 1 |
| R07 | 1 | | | 1 | | 1 | | 1 | 1 | |
| R08 | | 1 | | | | | | 1 | 1 | 1 |
| R09 | | | 1 | | 1 | | 1 | 1 | 1 | 1 |
| R10 | | | | 1 | | 1 | 1 | 1 | 1 | 1 |
| R11 | | | | | 1 | | 1 | 1 | 1 | 1 |
| R12 | | | | 1 | | 1 | 1 | 1 | 1 | 1 |

|  | CONNECTION | | | | | | | | |
|---|---|---|---|---|---|---|---|---|---|
|  | E02 | E03 | E04 | E06 | E07 | E09 | E10 | E11 | E12 |
| E01 | 1 |  | 1 |  |  |  |  |  |  |
| E02 |  | 1 |  |  |  |  |  |  |  |
| E03 | 1 | 1 |  | 1 |  |  |  |  |  |
| E04 |  |  |  | 1 | 1 |  |  |  |  |
| E06 |  | 1 |  |  | 1 | 1 |  |  |  |
| E07 |  |  | 1 |  |  | 1 | 1 |  |  |
| E09 |  |  |  | 1 |  | 1 |  |  | 1 |
| E10 |  |  |  |  | 1 |  | 1 | 1 |  |
| E11 |  |  |  |  |  |  | 1 |  | 1 |
| E12 |  |  |  |  |  | 1 |  | 1 | 1 |
| R01 | 1 | 1 | 1 |  | 1 |  |  |  |  |
| R02 | 1 | 1 | 1 | 1 |  |  |  |  |  |
| R03 | 1 | 1 |  | 1 |  | 1 |  |  |  |
| R04 | 1 |  | 1 |  | 1 |  | 1 |  |  |
| R05 | 1 | 1 |  |  |  |  |  | 1 |  |
| R06 | 1 | 1 |  | 1 | 1 |  |  |  | 1 |
| R07 |  |  | 1 |  | 1 |  | 1 | 1 |  |
| R08 | 1 |  |  |  |  |  | 1 | 1 | 1 |
| R09 |  | 1 |  | 1 |  |  | 1 | 1 | 1 |
| R10 |  |  | 1 |  |  | 1 | 1 | 1 | 1 |
| R11 |  |  |  |  |  | 1 | 1 | 1 | 1 |
| R12 |  |  |  | 1 |  | 1 | 1 | 1 | 1 |

FIG. 10

| | CONNECTION | | | | | | | | | | | | | | | | | | | | |
|---|---|---|---|---|---|---|---|---|---|---|---|---|---|---|---|---|---|---|---|---|---|
| NODE(E)<br>NODE(E) | 01<br>02 | 01<br>03 | 01<br>04 | 01<br>05 | 01<br>06 | 01<br>07 | 02<br>03 | 02<br>04 | 02<br>05 | 02<br>06 | 02<br>07 | 03<br>04 | 03<br>05 | 03<br>06 | 03<br>07 | 04<br>05 | 04<br>06 | 04<br>07 | 05<br>06 | 05<br>07 | 06<br>07 |
| ROUTE 1<br>(R NODE) | 01<br>02 | 01<br>03 | 01<br>02<br>04 | 01<br>02<br>04<br>05 | 01<br>02<br>04<br>05<br>06 | 01<br>02<br>04<br>07 | 02<br>01<br>03 | 02<br>04 | 02<br>04<br>05 | 02<br>04<br>05<br>06 | 02<br>04<br>07 | 03<br>04 | 03<br>04<br>05 | 03<br>04<br>05<br>06 | 03<br>04<br>07 | 04<br>05 | 04<br>05<br>06 | 04<br>07 | 05<br>06 | 05<br>04<br>07 | 06<br>07 |
| ROUTE 2<br>(R NODE) | | 01<br>03 | 01<br>03<br>04 | 01<br>02<br>04<br>05 | 01<br>03<br>04<br>07 | 02<br>04<br>03 | | 02<br>04<br>07 | | | | 03<br>04<br>07<br>06 | | | | 04<br>07<br>06 | | | 05<br>06<br>07 | | |
| ROUTE 3<br>(R NODE) | | | | | 01<br>03<br>04<br>05<br>06 | | | | | | | | | | | | | | | | |
| ROUTE 4<br>(R NODE) | | | | | 01<br>03<br>04<br>07<br>06 | | | | | | | | | | | | | | | | |

FIG. 11A

| | CONNECTION | | | | | | | | | | | | | | | | | | | | |
|---|---|---|---|---|---|---|---|---|---|---|---|---|---|---|---|---|---|---|---|---|---|
| | 01<br>02 | 01<br>03 | 01<br>04 | 01<br>05 | 01<br>06 | 01<br>07 | 02<br>03 | 02<br>04 | 02<br>05 | 02<br>06 | 02<br>07 | 03<br>04 | 03<br>05 | 03<br>06 | 03<br>07 | 04<br>05 | 04<br>06 | 04<br>07 | 05<br>06 | 05<br>07 | 06<br>07 |
| R01 | 100 | 100 | 100 | 100 | 100 | 100 | 50 | | | | | | | | | | | | | | |
| R02 | 100 | | | 50 | 50 | 50 | 100 | 100 | 100 | 100 | 100 | | | | | | | | | | |
| R03 | | 100 | 50 | 50 | 50 | 50 | 100 | | | | | 100 | 100 | 100 | 100 | | | | | | |
| R04 | | | 100 | 100 | 100 | 100 | 50 | 100 | 100 | 100 | 100 | 100 | 100 | 100 | 100 | 100 | 100 | 100 | | 50 | |
| R05 | | | | 100 | 50 | | | | 100 | 50 | | | 100 | 50 | | 100 | 50 | | 100 | 100 | |
| R06 | | | | | 100 | | | | | 100 | | | | 100 | | | 100 | | 100 | 50 | 100 |
| R07 | | | | | 50 | 100 | | | | | 100 | | | | 100 | | | 100 | | 100 | 100 |

FIG. 11B

| | CONNECTIONS | | | |
|---|---|---|---|---|
| | 01<br>06 | 03<br>04 | 05<br>07 | 06<br>07 |
| R01 | 100 | | | |
| R02 | 50 | | | |
| R03 | 50 | 100 | | |
| R04 | 100 | 100 | 50 | |
| R05 | 50 | | 100 | |
| R06 | 100 | | 50 | 100 |
| R07 | 50 | | 100 | 100 |

Given: A graph $G$ representing the network. A set of nodes ($G_0$) selected from the set of nodes $G$ that can host monitors. The set of routes $R$ between pair of nodes in $G_0$.

Steps:
1. For each pair of nodes $n1$ and $n2$ of $G_0$:
   a. Create an entry in the mapping representation for the connection $(n1,n2)$.
2. For each node $n$ in $G$:
   a. Create entry in the mapping representation in the codebook table for $n$.
   b. For each $(n1,n2)$, check to see if $n$ is in the route $R$ between $n1$ and $n2$.
      i. If yes, then mark 1 in the intersection of $(n1,n2)$ and $n$ in the mapping representation.

FIG. 13B

Given: A graph $G$ representing the network. A set of nodes ($G_0$) selected from the set of nodes $G$ that can host monitors. The set of routes $R$ between pair of nodes in $G_0$.

Steps:
1. For each pair of nodes $n1$ and $n2$ of $G_0$:
   a. Create an entry in the mapping representation for the connection $(n1,n2)$.
2. For each node $n$ in $G$:
   a. Create entry in the mapping representation in the codebook table for $n$.
   b. For each $(n1,n2)$, check to see if $n$ is in the route $R$ between $n1$ and $n2$.
      i. If yes, then mark $p$ in the intersection of $(n1,n2)$ and $n$ in the mapping representation.

FIG. 14A

Given: A graph $G$ representing the network. A set of nodes ($G_0$) selected from the set of nodes $G$ that can host monitors. The number $r$ of hops that a node failure will impact.

Steps:
1. For each pair of nodes $n1$ and $n2$ of $G_0$:
   a. Create an entry in the mapping representation for the connection $(n1,n2)$.
2. For each node $n$ in $G$:
   a. Create an entry in the mapping representation table for $n$.
   b. For each column $(n1,n2)$, check to see if $n1$ or $n2$ are within $r$ hops from $n$ in $G$.
      i. If yes, then mark indication in the intersection of $(n1,n2)$ and $n$ in the mapping representation.

FIG. 14B

Given: A graph $G$ representing the network. A set of nodes ($G_0$) selected from the set of nodes $G$ that can host monitors. The number $r$ of hops that a node failure will impact.

Steps:
1. For each pair of nodes $n1$ and $n2$ of $G_0$:
   a. Create an entry in the mapping representation for the connection $(n1,n2)$.
2. For each node $n$ in $G$:
   a. Create an entry in the mapping representation for $n$.
   b. For each column $(n1,n2)$, check to see if $n1$ or $n2$ are within $r$ hops from $n$ in $G$.
      i. If yes, mark an indication, $f(p,n,n1,n2)$, in the intersection of $(n1,n2)$ row $n$ in the mapping representation.

FIG. 15A

Given: A graph $G$ representing the network. A set of nodes ($Go$) selected from the set of nodes $G$ that can host monitors. The number $r$ of hops that a node failure will impact.

Steps:
1. For each pair of nodes $n1$ and $n2$ of $Go$:
   a. Create an entry in the mapping representation for the connection $(n1,n2)$.
2. For each node $n$ in $G$:
   a. Create an entry in the mapping representation table for $n$.
   b. For each column $(n1,n2)$, check to see if $n1$ or $n2$ are within $r$ hops from $n$ in $G$.
      i. If yes, then mark indication, e.g., "1", in the intersection of $(n1,n2)$ and $n$ in the mapping representation.
3. For each node $n$ that is a cut node or adjacent to a cut edge in $G$:
   a. Locate the entry in the mapping representation for $n$.
   b. For each $(n1,n2)$, check to see if $n1$ or $n2$ lie in two different partitions of $G-n$.
      i. If yes, then mark an indication in the intersection of $(n1,n2)$ and $n$ in the mapping representation.

FIG. 15B

Given: A graph $G$ representing the network. A set of nodes ($Go$) selected from the set of nodes $G$ that can host monitors. The radius $r$ of hops that a node failure will impact. A probability $p$. A function $f$ that takes as input a probability and two distances and returns a probability.

Steps:
1. For each pair of nodes $n1$ and $n2$ of $Go$:
   a. Create an entry in the mapping representation for the connection $(n1,n2)$.
2. For each node $n$ in $G$:
   a. Create an entry in the mapping representation table for $n$.
   b. For each $(n1,n2)$, check to see if $n1$ or $n2$ are within $r$ hops away from in $G$.
      i. If yes, then let $d(x,y)$ be the distance in hops between $x$ and $y$. Mark with an indication, $f(p,n,n1,n2)$ in the intersection of $(n1,n2)$ and $n$ in the mapping representation.
3. For each node $n$ that is a cut node or adjacent to a cut edge in $G$:
   a. Locate the entry in the mapping representation for $n$.
   b. For each $(n1,n2)$, check to see if $n1$ or $n2$ lie in two different partitions of $G-n$.
      i. If yes, then mark an indication in the intersection of $(n1,n2)$ and $n$ in the mapping representation.

FIG. 16

Given: A graph $G$ representing the network. A set of nodes ($Go$) selected from the set of nodes $G$ that can host monitors.

Steps:
1. For each pair of nodes $n1$ and $n2$ of $Go$:
   a. Create an entry in the mapping representation for the connection $(n1,n2)$
2. For each node $n$ in $G$:
   a. Create entry in the mapping representation for $n$.
   b. For each $(n1,n2)$.
      i. Let $R(n1,n2)$ be the set of routes between $n1$ and $n2$.
      ii. Let $g(n1,n2,k)$ be the number of routes in $R(n1,n2)$ of size $k$. and $g(n1,n2)$ be a function of all $g(n1,n2,k)$.
      iii. Let $c(n1,n2,n,k)$ be the number of times that node $n$ appears in a route in $R(n1,n2)$ of size $k$ and $c(n1,n2,n)$ is a function of all $c(n1,n2,n,k)$.
      iv. Let $h(n1,n2,n,k)$ be a function that relates functions $c$ and $g$, wherein an indication, $h(n1,n2,n)$, is provided in the mapping representation when a relationship between $(n1,n2)$ and $n$ is determined.

METHOD AND APPARATUS FOR DETERMINING MONITORING LOCATIONS IN DISTRIBUTED SYSTEMS

CLAIM OF PRIORITY

This application claims the benefit, pursuant to 35 USC §119(e), of the earlier filing date of U.S. Provisional Patent Application Ser. No. 60/552,559, entitled "Method and Apparatus for Monitoring Distributed Systems," filed in the US Patent Office on Mar. 12, 2004, the contents of which are incorporated by reference, herein.

RELATED APPLICATIONS

This application is related to commonly-owned:
U.S. patent application Ser. No. 11/077,932, entitled "Method and Apparatus for Generating Causality Mapping of Distributed Systems," concurrently filed.

BACKGROUND OF THE INVENTION

1. Field of the Invention

The present application relates to monitoring distributed systems for monitoring, analysis and management and more particularly to reducing the number and determining the appropriate location of monitors used for system monitoring, analysis and management operations.

2. Description of Related Art

Management and analysis of networks and other distributed systems, e.g., computer, communication, etc., conventionally involves monitoring individual components of the system. In a network, monitored components can include hardware elements such as servers, hosts, routers, switches, links, interfaces, etc. and software elements such as operating systems, infrastructure middleware, protocol stacks, applications, services, etc. The network components are typically monitored to detect events in the network such as faults, component failures, latency, bottlenecks, etc. The nodes in a network or distributed system generally have the basic mechanisms needed to reply to monitoring requests generated by monitors. In addition, the monitors can typically communicate with one another. In a given system, the monitoring can detect properties or characteristics such as reachability, latency, throughput, utilization, status, or any other measurement that the monitors have been configured to monitor.

There are several possible sources for monitoring information in a conventional distributed system. These sources may include agents, agent-less monitors, and beacons. An agent is an entity located at or close to the monitored component, e.g., node, that can provide information regarding the component being monitoring, i.e., local information. The agent can be implemented in software, hardware, or some combination thereof. Agents typically operate under a particular network management standard such as Simple Network Management Protocol (SNMP), which allows for remote access to the monitoring information.

An agent-less monitor typically relies on an Application Program Interface (API) provided by the system itself to retrieve monitoring information. The agent-less monitor removes the necessity of placing an agent local to managed component to collect the information. Agent-less monitors are well-known and are used in software systems using standards such as Java Management Extensions (JMX), Windows Management Interface (WMI), etc.

A beacon is a software entity executing at a hosting device and is capable of monitoring internal as well as external components of the hosting device or other devices in the network. The monitoring of other devices by a beacon produces measurements perceived from the location of the beacon. For example, a beacon residing at a node or device D1 monitoring the connectivity to another node or device D2 may indicate whether information transmitted from device D1 can reach device D2.

As used herein, the term monitor or monitoring entity refers to that entity or combination of entities used for retrieving, obtaining, accessing or reading monitoring information, including but not limited to, agents, agent-less monitors and beacons as described above.

Monitoring activities in a distributed system may be more formally stated as:
 Let N be the set of nodes;
 Let K be any set of pairs of nodes; and
 Let monitoring function g or analysis function α include:
  (1) collecting measurements on all members of N with the support of the monitors; and/or
  (2) collecting measurements on all members of K with the support of the monitors.

An example of a monitoring or analysis function may be to detect failures of a node in a distributed network system or of an application component in a distributed applications. Such failure can propagate in the network (application) and manifest symptoms detected by the monitors such as the inability of a client to communicate with a server, for example. The management system may then use known techniques to identify the root cause of the problem by analyzing the observed or detected symptoms.

Prior art management of distributed systems conventionally involves using monitors for monitoring every significant component in the network or system. Such widespread monitoring of system components is necessary for proper analysis and management of the system. It is, however, costly and results in high computation overhead as high volume of traffic is needed to relay all the events that the monitoring entities detect or observe to the management stations. Furthermore, it can be difficult to scale the monitoring tasks as the number of devices grows. This is particularly true in the case where the network bandwidth is limited.

However, often not all the detected events, i.e., symptoms, are needed to complete a desired analysis function or operation, e.g., a root cause problem identification. It may for example be possible to conclude that the network or distributed application failed, even if not all of the client/server connection failures are detected and considered. A sufficient number of monitors should be provided to always determine the desired operation, e.g., the root cause, or to significantly limit the set of possible root causes for all problems of interest.

Hence, a need exists in the industry for a method and apparatus for reducing the number of monitoring entities and/or appropriately locating the monitoring entities while still substantially attaining the required system operations and management goals.

SUMMARY OF THE INVENTION

A method and system for determining the number and location of monitoring entities in a distributed system is disclosed. The method comprising the steps of automatically generating a causality mapping model of the dependences between causing events at the nodes of the distributed system and the detectable events associated with a subset of the nodes, the model suitable for representing the execution of at least one system operation, reducing the number of detectable events in the model, wherein the reduced number of detectable events is suitable for substantially representing the execution of the at least one system operation, and placing at least one of the at least one monitoring entities at selected ones of the nodes associated with the detectable events in the reduced model. In another aspect of the invention, methods are disclosed for generating the model of the distributed system.

BRIEF DESCRIPTION OF THE DRAWINGS

FIG. 4 illustrates the routes for the network N1;

FIGS. 5A and 5B illustrate a model representation and a reduction of same, respectively, of the network N1, in accordance with the principles of the present invention;

FIGS. 6A and 6B illustrate a model representation and a reduction of same, respectively, of the network N1, in accordance with the principles of the present invention;

FIGS. 7A and 7B illustrate a model representation and a reduction of same, respectively, of the network N1 in accordance with the principles of the present invention;

FIGS. 8A and 8B illustrate a model representation and a reduction of same, respectively, of the network N1 in accordance with the principles of the present invention;

FIG. 9 illustrates a graph representing a second sample network referred to as "N2."

FIG. 10 illustrates the routes for the network shown in FIG. 9;

FIGS. 11A and 11B illustrate a cp-LNH model representation and a reduction of same, respectively, of the network N2, in accordance with the principles of the invention;

FIGS. 12A and 12B illustrate an cp-LNH representation and a reduction of same, respectively, of the network N1, in accordance with the principles of the invention;

FIGS. 13A and 13B illustrate exemplary processing associated with a first aspect of the present invention;

FIGS. 14A and 14B illustrate exemplary processing associated with a second aspect of the present invention;

FIGS. 15A and 15B illustrate exemplary processing associated with a third aspect of the present invention;

FIG. 16 illustrates exemplary processing associated with a fourth aspect of the present invention.

Figure 1:
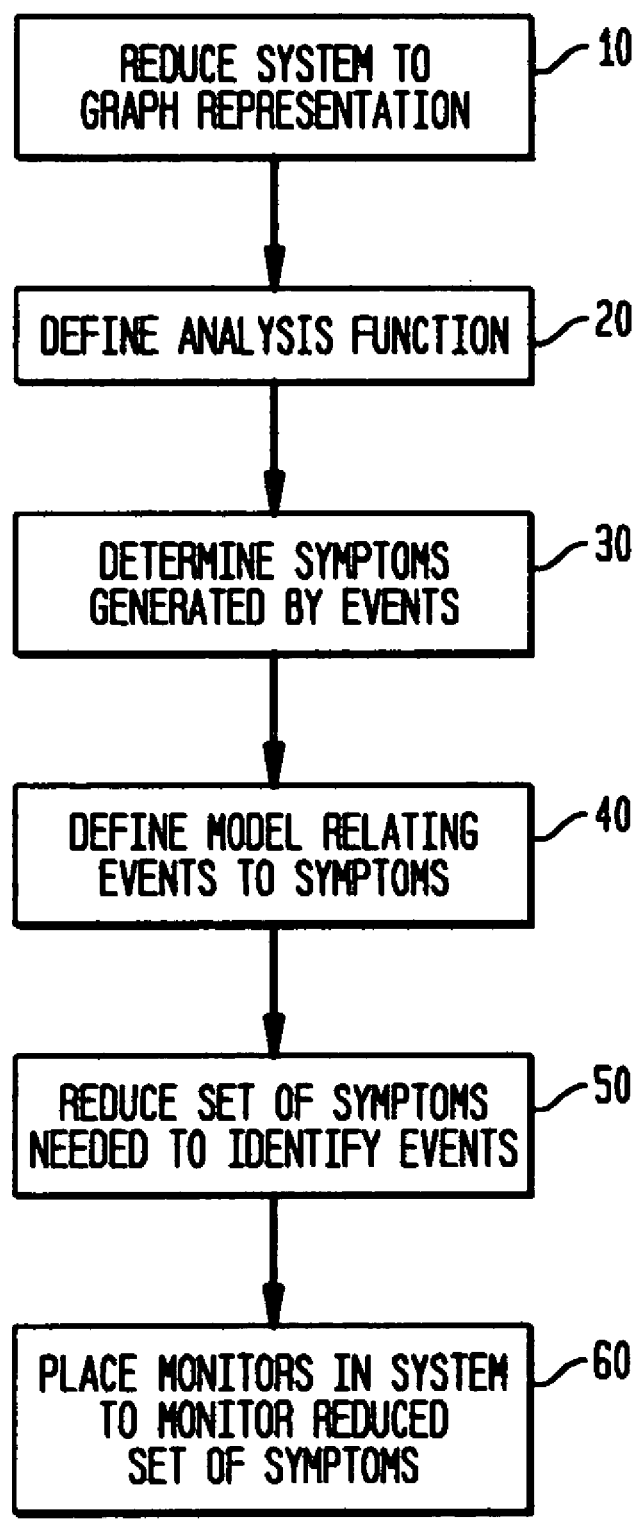
FIG. 1 illustrates a flow chart showing an exemplary method of selective network monitoring in accordance with the principles of the invention.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements

DETAILED DESCRIPTION

In accordance with the principles of the invention, a distributed system management task may be reduced to managing a known property of a graph G or other representation of the network. The graph representation of the network includes nodes that may represent a number of hardware or software system components and the links between nodes that may represent a number of relationships or dependencies among the nodes. For example, a represented or managed system may be a network of routers connected via physical links or virtual connections or a distributed application with components executing at different hosts or servers. In the latter case, the links can represent the dependencies between the application and the hosting system, between the application components themselves, and/or between the hosting systems themselves. The graph properties to be monitored can include, but are not limited to, node failures, link failures, node processing overload, link traffic congestion, application component failure, etc. As would be appreciated, not every property may be of interest in a given analysis.

The problems addressed by one or more embodiments of the invention may be more formally stated as:

1. given a network, a monitoring function g, and/or an analysis function α:

(1) Generate a causality mapping relationship of causing events and detectable events with regard to the function α;

(2) Determine a substantially minimum number n of monitors, b[i], that can be located in order to monitor the network and substantially enable the analysis α? and (2) Determine in which nodes should the n monitors b[i] be placed?

In another aspect of the invention, a further restriction may be imposed as:

(3) network nodes are partitioned into two sets, Gi and Go, and the analysis function α remains substantially operable with the monitors restricted to those nodes of set Go, i.e., the subset of nodes of G.

FIG. 1 represents a flow chart describing an exemplary process for determining a number of monitors and their respective locations in a network in accordance with the principles of the invention.

At step 10, a system is represented or converted into a graph or some other representation or model of the system using well-known and existing methods, which need not be discussed in detail herein.

At step 20, an analysis function α is defined. The analysis function specifies the desired type of system analysis to be performed from the information obtained from the monitoring locations or stations. The system operation or analysis function, a, includes a collection or subset of the events E that may occur in the system including but not limited to, potential problem. As would be appreciated, the term problems may be considered special kinds of events, which are referred to, herein, as exceptional events or causing events. Accordingly, the analysis function, α, has a signature that may be expressed as:

$$\alpha: E^* \to C$$

where

E* is a collection of one or more events from E; and

C is the set of possible conclusions of α.

An example of an analysis function α may be to detect failures or congestion, for example, in network nodes (or their subsets) or software application components that may be distributed over a network. In this case, problems may be more formally stated as:

for the events, e1, e2, ... ek, in node n:

$\alpha$(e1, e2 ... ek)=Congested, if the network is congested"; and $\alpha$(e1, e2, ... ek)=Not Congested, otherwise.

wherein C represents {Congested, Not Congested}.

Although the present invention is described with regard to failure detection, it would be understood that other examples of function $\alpha$, for the case of a network, may include analysis of link failures, node failure, combined link and node failures, node overload, link overload, combined overload, etc. Similar failure detection operations may be performed with regard to distributed software applications.

At step 30, a set S of symptoms is defined for which events e in domain E may generate. Symptoms are observable events or detectable events, wherein, a symptom is a special type of event, which are referred to herein as detected events or observable events. Symptoms are typically related to properties of sets of nodes or adjacent links. Or in the distributed software application, symptoms are related to properties, e.g., protocols, operations, etc., of application components At step 40, a model relating each event in E that may occur at a node to each relevant symptom or symptoms in S is created. Mapping of causing events to relevant or related symptoms, i.e., detectable events, through an event correlation or causality matrix is described in U.S. Pat. Nos. 5,661,668; 5,528,516; and 6,249,755 and U.S. patent application Ser. No. 10/400,718, now U.S. Pat. No. 6,868,367 and application Ser. No. 11/034,192, entitled "Method and Apparatus for Event Correlation and Problem Reporting," the contents of all of which are incorporated by reference, herein. The referred-to US Patents teach mapping event sets E to symptom sets S via an indication or dependency. The indication or dependency may be, for example, a value that represents the probability that a selected event generates one or more symptom in the symptom set S. The basic mapping operation matches observed symptoms against the causing events to identify the root event or problem, which has generated the symptoms. The monitors observe or detect the symptoms that correspond to the mapping representation of causing events and symptoms. Although the mapping shown herein is described with regard to a matrix representation, one skilled in the art would recognize that the mapping represents the relationship between causing events and detected events and that the data structure, e.g., matrix, graph, is merely a choice of implementation. Hence, it is not the intention to limit the scope of the invention to the matrix representation shown herein.

At any moment in time, there will be a sample of observed symptoms. The symptoms may be represented in the form of an array $(s_1, s_2, \ldots, s_n)$, where each $s_i \in \{0,1\}$ corresponds to one of the columns of the matrix. The value of $s_i$ is 0 if the symptom has not been observed and 1 if it has been observed. The events, which are represented in the rows of the matrix, referred to as a codebook in the aforementioned US patents, may be represented as, $((c_{1,1}, c_{1,2}, \ldots, c_{1,n}), (c_{2,1}, c_{2,2}, \ldots, c_{2,n}), \ldots, (c_{m,1}, c_{m,2}, \ldots, c_{m,n}))$. That is, the rows include m events and n symptoms. The goal is to match the set of symptoms, $(s_1, s_2, \ldots, s_n)$, with one of the rows in the events in the codebook row.

As the model or codebook is an approximation of the operation of the real system, the observed symptoms may not fully correspond to any row of the codebook. In addition, symptoms may be lost or spurious symptoms may appear, further complicating the matching problem. A more generic aspect of the matching problem is to find a function, i, such that the distance between set of observed symptoms and the matrix, $d((s_1, s_2, \ldots, s_n), (c_{i,1}, c_{i,2}, \ldots, c_{i,n}))$, is minimized for some distance function d. In the case of binary codebooks, d can be a Hamming distance, which is well known in the art.

Although the present invention is described with regard to the preferred codebook model, those skilled in the art would recognized that the codebook model is not the only possible model that may be used to relate or correlate events and symptoms. For example, other possible models may be selected from, without limitation, rule based and/or generic programming systems.

At Step 50, the model is reduced in a manner to reduce the number of symptoms to be monitored, yet still satisfy the condition that the system operation or function $\alpha$ substantially is operable. More specifically, the model is reduced to use a reduced number of symptoms, S', such that for each relevant subset So of S, i(So)=Eo implies that i(So∩S')=Eo as well. That is, for a minimized set of symptoms S', if only the symptoms of So that are in the minimized set of symptoms S' are considered it is still possible to substantially identify the same set of events Eo using the identification function i.

In another aspect, i may represent a function that given any subset So of S, i(So)=Eo, where Eo is the subset of elements of E that can generate symptoms close to So. The notion of "how close" two sets of symptoms are may be specified by some distance function d. More formally stated, d(Sa, Sb)=k, for any two subsets of S(Sa and Sb), and some real value k. The value k reflects the distance measure between Sa and Sb. In a binary case the distance may be a Hamming Distance.

At step 60, a monitor is placed in every node of G that can monitor at least one of the symptoms in the minimized set S'. A monitor can detect or observe a symptom when it is located at the node that has the symptom or at a node adjacent to a link that has the symptom.

Determination of Number and Location of Monitoring Sites

An example illustrating the methods for determining a reduced set of monitors and the respective locations of the monitors in a distributed system, in accordance with the principles of the invention, is now discussed with regard to following examples.

Figure 2:
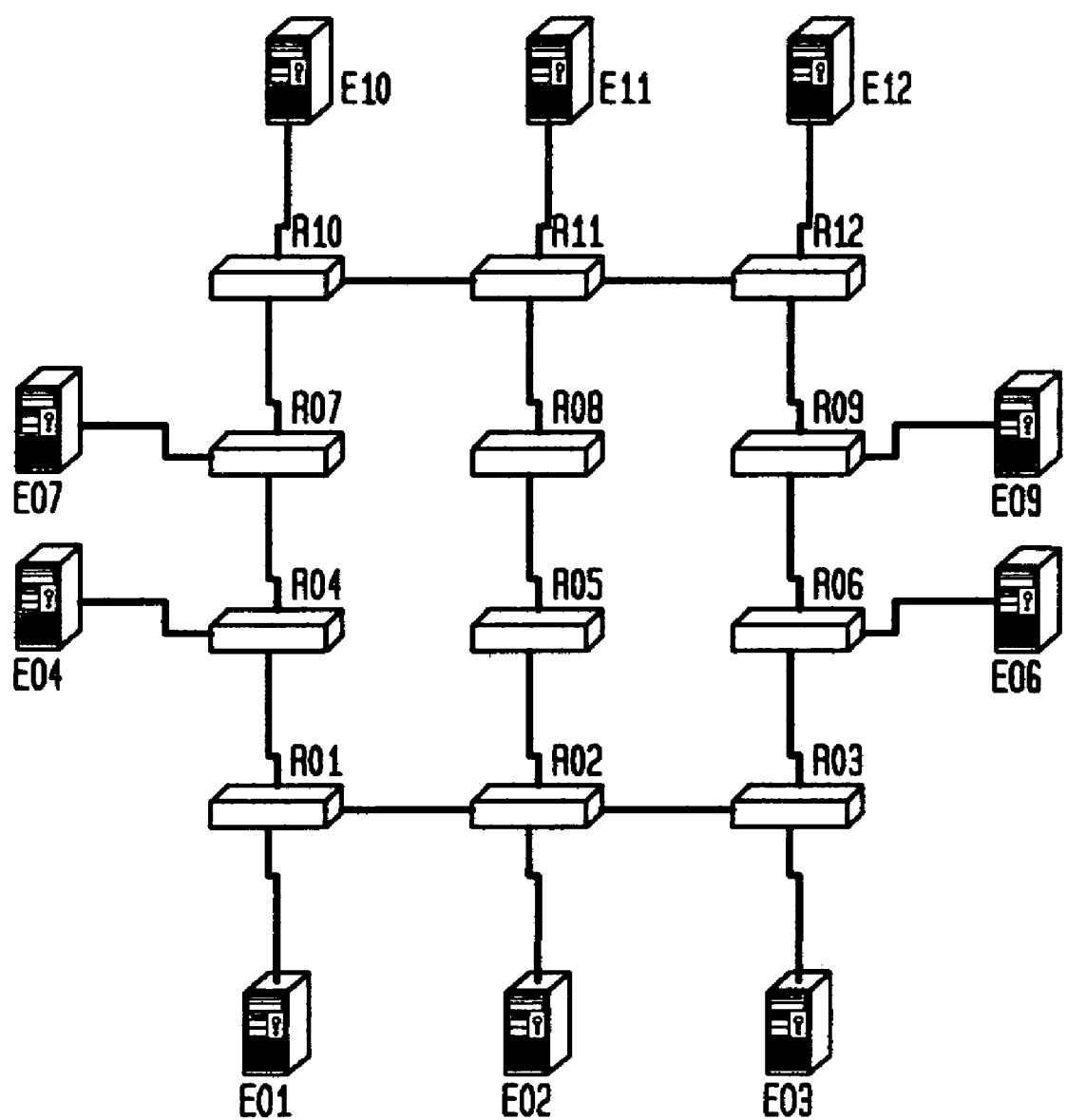
FIG. 2 illustrates a sample network, referred to as "N1;"

FIG. 2 illustrates a sample network N1 200 containing several edge nodes (e.g., servers), which are designated with labels starting with the letter 'E' for Edge, that are used to connect client or consumer (not shown) to the network 200. Further illustrated are routers, which are designated with labels starting with the letter 'R', which are connected to selected edge nodes and proved communication through the network N1 from one edge node to another.

In a particular example, a restriction with regard to the placement of monitors may be that monitors are only placed at the edge nodes and not placed at any of the network internal router nodes. That is, no direct monitoring is performed at the routers. In this case, each monitor will measure a connection between the servers. As there are 10 edge nodes in the network shown in FIG. 2, there are thus $$\binom{10}{2} = 45$$

possible connections between the edge nodes, i.e., E01 to E02, E01 to E03, E01 to E03, ... E02 to E03, E02 to E04, ... E03 to E04, E03 to E05, etc.

In the illustrated examples to follow, restrictions imposed with regard to the placement of monitors may be more formally presented as:

(1) the set Go includes only edge nodes; and
(2) the monitoring function g monitors connectivity between pairs of nodes in Go.

Figure 3:
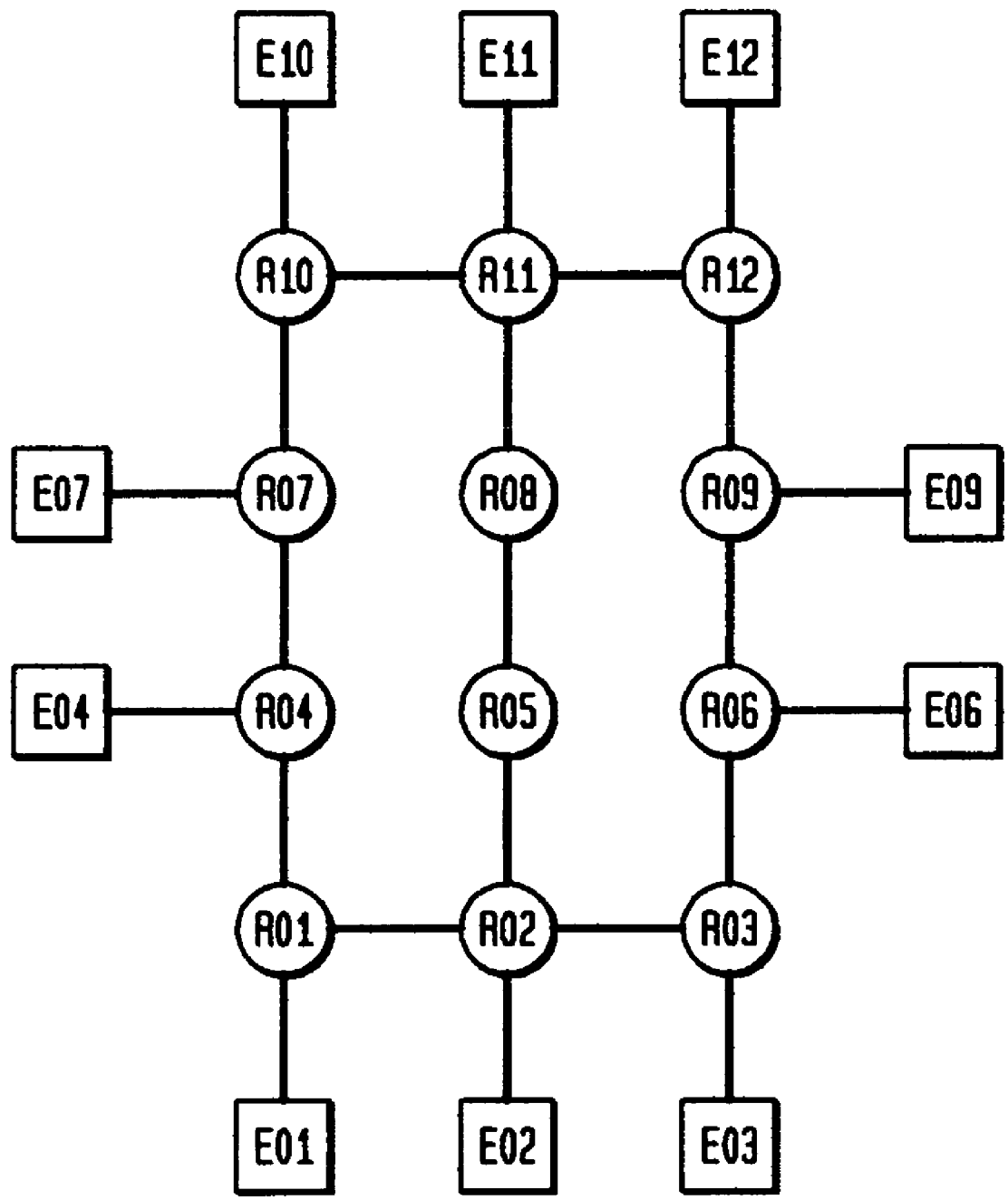
FIG. 3 illustrates a graph representing network the network N1.

Returning to the processing shown in FIG. 1, at Step 10, the objects and relationships in the system are represented in a graph or other representation of the system. FIG. 3 illustrates an exemplary graphic representation of network 200 (FIG. 2). For purposes of illustration, the nodes of the graph are represented as squares representing edge devices and circles representing routers.

As one skilled in the art would recognize, the modeled objects are represented as nodes and the relationships between the modeled objects are represented as edges. Attributes of the modeled objects and links can optionally be assigned. For example, the nodes in the graph of FIG. 3 have different shapes representing their respective positions (edge node or core node) in the system. The shape is a kind of attribute associated with the node object. Other attributes may include the node identifier, number of interfaces at the node, the speed of interfaces, the processing capacity of the nodes and/or interfaces, the memory capacity, etc. However, it would be recognized that the different shapes shown, herein, are merely used to distinguish the different operations of the nodes shown and are not intended to limit the scope of the invention to such shapes.

Referring to step 20 of FIG. 1, an analysis function $\alpha$ may be defined to detect routing or connectivity problems or failure of nodes in the set of nodes G, wherein for every event e(n) in a node n in G:

$a(e(n))$=True, if e(n) is n non-responsive; and
$a(e(n))$=False, otherwise.

A routing problem (which is a special kind of event) in a network can occur due to a physical problem, e.g., interface failure, node failure, link failure, etc., or may be a software problem, e.g., routing protocol error, routing control bugs, etc. The symptoms, or detectable events, caused by the physical or software problems may manifest in several forms in different parts of the system, e.g., an overloaded link, delays in application connections, congestion, etc.

At step 30, a set of problems and symptoms, are formulated with regard to the selected analysis function. For purposes of illustrating the principles of the invention node failure problems are discussed further. In this case, failures can occur only on network nodes and the only visible or detectable symptoms are failures in connections. More specifically, the set E of events is composed of failures at each node and the set of symptoms S are failures of connections on pairs of nodes. The analysis function $\alpha$ can determine which event occurred based on the observed or detected symptoms.

Although not shown, it would be recognized that additional problems or failures in routing mechanisms can be reduced to a similar representation as well. For example, link and interface failures can be introduced by including nodes in the graph that explicitly represent the interfaces. A link failure, for example, can be detected by verifying that all interfaces incident to the link are not able to send or receive data. Another possibility is to explicitly include a node that represents the link and include edges in the graph between such a node and all adjacent nodes in the original network. For purpose of illustration, only node failures are used to describe the steps of the method claimed.

At Step 40, a model is created relating the events in E with the effects they may have on application connections, i.e., the symptoms of S. There are several possible methods of creating such a model. Generally, any modeling language can be used to represent the model. Examples of such modeling languages include, but are not limited to, Managed Object Definition Language or MODEL available from System Management ARTS, Inc. of White Plains, N.Y., codebook, Common Information Model (CIM), C++, etc. For purposes of illustrating the present invention, the codebook representation, which is described in greater detail in the aforementioned commonly-owned U.S. patents, is used for the examples that follow.

The codebook content depends on the particular field to which the method is applied. For purposes of illustration, the method shown is applied to the problem of node failures and their impact on an application end-to-end connectivity between members or nodes of the set of Go. However, application to other problems is also possible as has been discussed previously.

To understand how a node failure may impact application connections, full information is preferably available about how routing of information (i.e., packets, frames, circuits, etc.) occurs through the network. However, in the absence of such full information, heuristic and other methods may be used that can approximate the missing information.

In one example, when full routing information is available, referred to herein as an FR model, a data structure, e.g., codebook, may be created that relates nodes with the application connections that the node failure impacts. That is, each application connection can be considered to know how the contents of the connection are routed. A data structure can then be formulated or generated that relates each node in the path to the application connection. In one aspect of the invention, a data structure suitable for determining a causality mapping for an FR model may be determined by the exemplary process shown, and described, with regard to FIG. 13A. Note that in this case the set of routes may include any routing strategy. The possible strategies include, but are not limited to, shortest path routing, random routing, etc.

Figure 4:
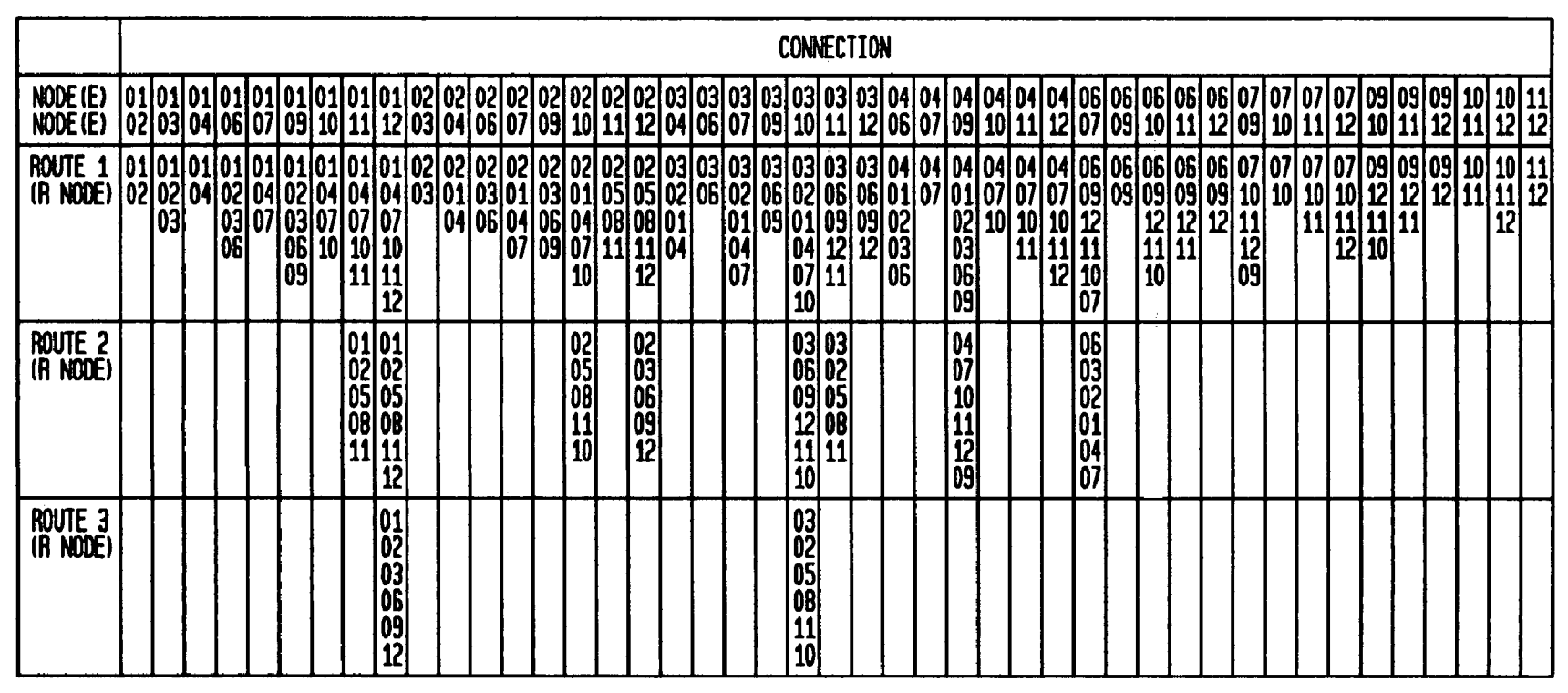

FIG. 4 illustrates the basic FR model routes for application connections in the exemplary network representation shown in FIG. 3. In this example, the first two lines identify the pair of edge (E) nodes (connections) and each column lists the routes between the node pair. In this case, the pair of edge nodes represent a subset of nodes of set G that are associated with detectable events. The subsequent rows identify the routes (route 1, route 2, and route 3) between the pair of edge nodes wherein the routes represent a series of router (R) nodes connecting the edge nodes. As would be recognized, only the number part of the route label is represented in the table as the type of node (E or R) can be inferred from the table structure. As an example, there are two routes between nodes E01 and E11: route 1 comprising routers R01, R04, R07, R10, R11 and route 2 comprising routers R01, R02, R05, R08, R11. In this case, a failure of R04, for example, impacts the path (E01, E11) when route 1 is selected but not when route 2 is selected. Hence, the impact of the failure of router R04 on the path between edge nodes E01, E11 depends upon the specific route selected to transfer information items from node E01 to node E11. Hence, there is one probability that a failure in R04 will impact path E01-E11 when route 1 is selected and a second probability that a failure in R04 will impact path E01-E11 when route 2 is selected. On the other hand, once a route is selected a failure of a node in the selected route would impact the path will a 100% probability. Similarly, a failure of router R01 or R11 will impact the path between edge nodes E01 and E11 with 100% probability no matter which route is selected.

Figures 5A, 5B:
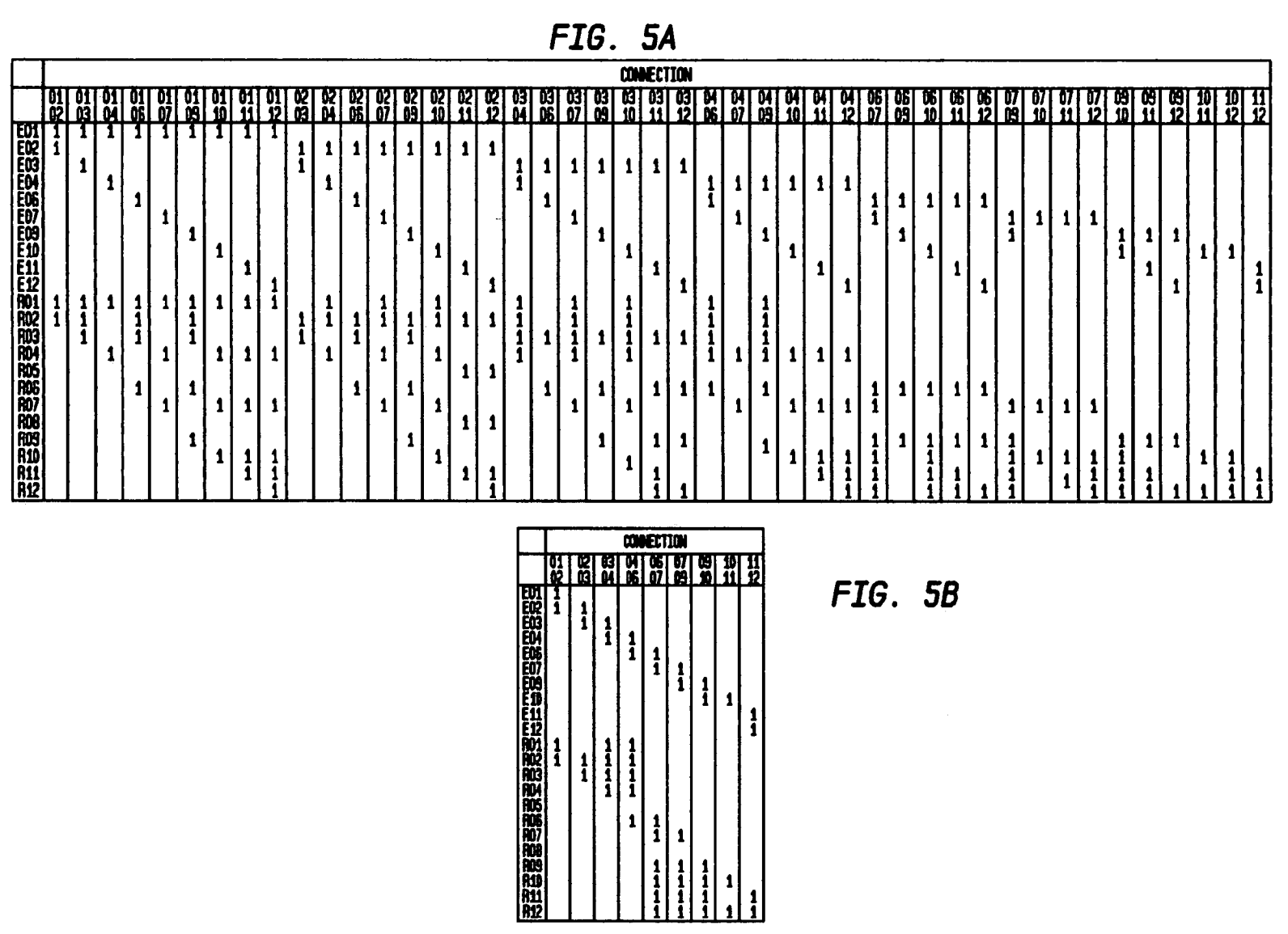

For illustrating the principles of the present invention, one route between each node is selected among the available routes to create the codebook model in this illustrated case, Route 1 is selected for analysis. FIG. 5A illustrates the resulting correlation or relationship between edge nodes and router node and the paths between the edge nodes for the network graph shown in FIG. 3. Each row represents a node and each column represents an application connection or paths between two edge nodes (the edge nodes in the first two rows in each column). The intersection of an entry corresponding to a causing event, (a row in this illustrated case) and an entry corresponding to a detected event (a column in this case) is a known value, i.e., "1", when a failure of a selected node in the row impacts the application connection in the respective column. On the other hand, the intersection of a row and a column is empty when a failure of the node in the row does not impact the application connection in the respective column.

Applying the processing represented by step 50 in FIG. 1 to the path representation matrix shown in FIG. 5A, a reduced set of monitoring points may be determined by reducing the number of columns by removing redundant information. Reduction of the number of columns, and hence, monitoring locations, is possible because a subset ($S_o$) of the all the symptoms (S) is sufficient to identify a problematic node or root cause of the symptoms observed or detected. As discussed previously, one method of reducing the redundant information from the information in the codebook shown is described in the aforementioned US patents and patent applications, which is, preferably, used herein to illustrate the principles of the invention. It would, however, be recognized by those skilled in the art that other methods may also be used to remove redundant information from the codebook.

FIG. 5B illustrates the reduction of the resulting correlation or relationship between edges and routers for the graph shown in FIG. 3 using Route 1. In this case, the number of connections that are required to be monitor is reduced from 45 to 9, wherein monitors need only be placed at nodes to monitor the connections E01-E02, E02-E03, E03-E04, etc. Hence, the number of monitors is significantly reduced. Although monitors are placed at one node of each of the connectivities, one would recognize that the single monitor at node E01, to monitor connection E01-E02, is significantly reduced from the individual monitors needed at node E01 to monitor connections E01-E02, E01-E03, E01-E04, etc. The number of monitors at each other node is similarly reduced as only a single monitor is needed at each node rather than the multiple monitors necessary to monitor all the connections starting at a node.

In the absence of loss of symptoms, a management system using the reduced information shown FIG. 5B is able to substantially identify the events (or problem) from the reduced set of symptoms as using all the original information shown in FIG. 5A. That is, if only the connections in the reduced codebook shown in FIG. 5B are observed, the system operation is suitable for substantially identifying the problem that pertains to the faulty node in a known system operation or analysis.

An enhancement to the FR algorithm described may include a probability value p that a given node n will be part of a route or path between nodes (n1, n2). This method is referred to herein as p-FR. In one aspect of the invention, a mapping representation for a p-FR model may be determined by the exemplary process shown, and described, with regard to FIG. 13B. As would be recognized, the probability could be different for each combination of nodes (n1, n2) and node n. For example, and with reference to FIG. 4, a failure in route R02 has a 100 percent impact upon the transmission of a message between edge nodes E01 and E03 as only a single route exists between the two nodes. Similarly, a failure in mode R02 has only a 50 percent impact upon the transmission of a message between edge nodes E01 and E11 as two routes exist between the two edge nodes. However, it would be recognized that once a route is selected, then the probability increases significantly if the router fails in the selected route.

In this illustrated case, a process for reducing the codebook matrix relationship between events and symptoms may be performed, similar to that described with regard to FIGS. 5A and 5B, to determine a reduced set of symptoms sufficient to substantially perform or executed a desired system operation or analysis α, and need not again be discussed in detail herein.

In another aspect of the invention, the impact of node failures in application connections may be limited to the impact of each node failure to nodes within a radius r around failed node n. In this case, the failure may be modeled in the absence of routing information, and is referred to herein as the Limited Number of Hops (LNH) Model. Furthermore, the probability of the impact may decrease the further away from node n the potentially impacted node is located. If n is larger than the longest path in the network, the model is suitable for predicting an impact of a node on every other node in the network. In one aspect of the invention, a mapping representation suitable for determining a causality mapping using a LNH model may be determined by the exemplary process shown and described with regard to FIG. 14A.

Figure 6A:
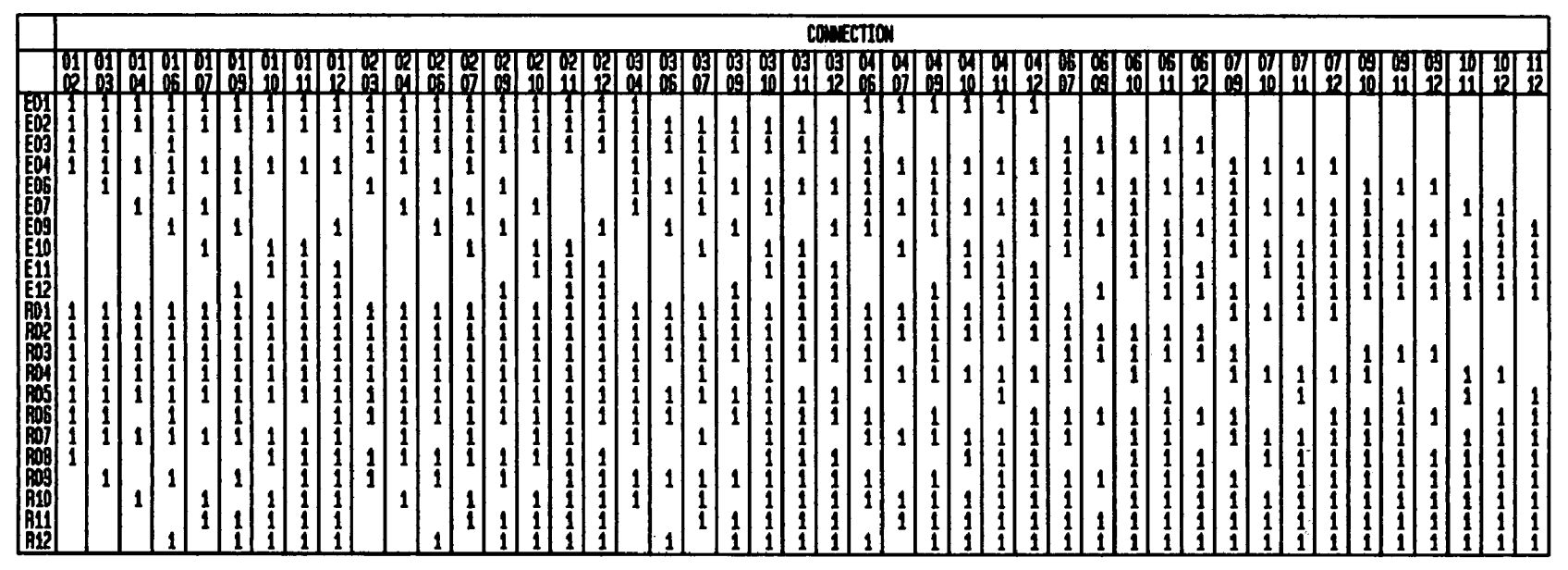

FIG. 6A illustrates the representation of an LNH model that determines the impact in network 200 (FIG. 3) of failures of a node to up to 3 hops away in accordance with the principles of the invention. For example, failure of router node R08 will have an impact on nodes R05 (1 hop away), R02 (2 hops away), and node (edge-server) E02 (3 hops away). However, a failure in router node R08 will not impact node E06 as it is at a radius (or distance) 5 hops away and beyond the criteria selected. In this case, a failure at router node R08 will thus impact every connection starting or ending at node E02, but not every connections starting or ending at node E06. Hence, the path or connectivity between nodes E02 and E06 is affected when a failure is detected in router R08, whereas the path between nodes E03 and E06 is not impacted because both E03 and E06 lie further than 3 hops away from the selected node R08. Again, 45 connection monitors are required to monitor the network Applying the processing shown at step 50 in FIG. 1 to the mapping (matrix) representation shown in FIG. 6A, a significant reduction of the number of symptoms to be monitored is achieved; from 45 to 16, as shown in FIG. 6B. Accordingly, the monitors can be placed in the appropriate edge nodes to monitor only the connections in the reduced codebook, i.e., E01 to E12, E02 to E06, E02 to E07, etc., to provide sufficient coverage to determine the impact caused by the failure of a node in the network.

In accordance with another aspect of the invention, the LNH model may be enhanced to include a probability p that a given node n will impact a connection (n1, n2) and is referred to herein as p-LNH model. There are several possible methods of introducing the probability. In one aspect, the p-LNH model may assign a probability in the range 0 and 1 for each intersection in the matrix that represents a node that will impact a connection. Assignment of probability values in the p-LNH model in one aspect is similar to that described with regard to the p-FR model. A codebook model for a p-LNH model and may be determined by the exemplary process shown and described with regard to FIG. 14B. The assignment of probability values is also described with regard to FIG. 14B.

Figure 7A:
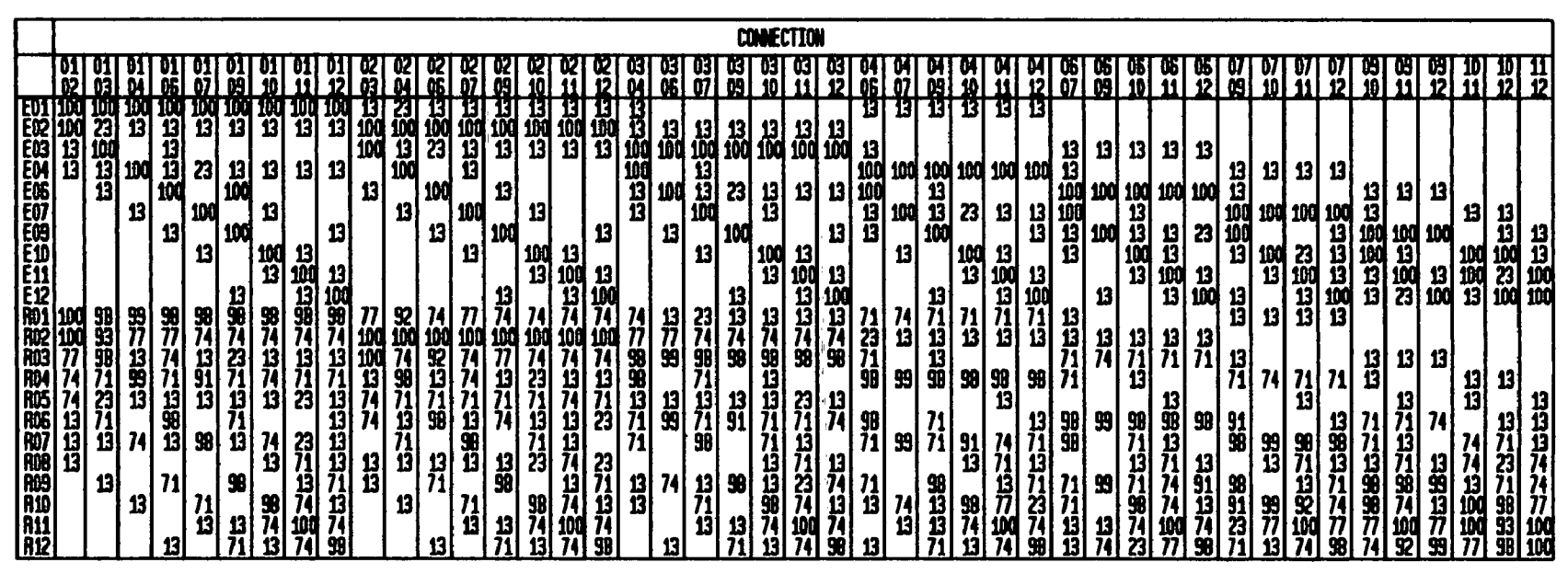

FIG. 7A illustrates an example of a codebook problem-symptom correlation for network 200 (FIG. 3) wherein probabilities are introduced in the model (p-LNH) to show the relationship among the nodes. The probabilities are shown as integer values between 0 and 100. FIG. 7B illustrates the reduction of the casualty representation (matrix) shown in FIG. 7A using a process similar to that described with regard to FIGS. 5A and 5b. In this case, the number of monitoring points is reduced from 45 required monitors to 6 monitors. In this case, monitors need only be placed in nodes E02, E03, E06, E07 and E10 to monitor connections E02 to E03, E03 to E12, E06-E09, E06 to E12, E07 to E12 and E10 to E12 to substantially identify the cause of detected symptoms. Note that two monitors are introduced in node E06 to monitor the two connections required.

In another aspect, the LNH model may further relate failures of a node with all the connections starting or ending at an impacted node. In this case, a node LNH representation, referred to as n-LNH, models the edge nodes and not the application connections. In this case, the model reflects the impact of a node n failure on a connection between nodes n1 and n2, wherein \ the failure impacts at least one of the nodes, i.e., n1 and/or n2, at the edges of the connection. But if node n1 or n2 is impacted, then all connections adjacent to the impacted node (n1 or n2) are also impacted as well. The n-LNH model infers that node n impacts nodes n1 and n2 simply, with no explicit mention to the adjacent connections. In this case, the set of symptoms S is defined to include non-responsiveness of nodes in Go (instead of application connections).

FIG. 8A illustrates an n-LNH model representation for network 200 shown in FIG. 2. In this case, the columns represent edge nodes that are impacted by a failure in a node as represented by the rows. An intersection between a column and a row is set to a known indication or value, i.e., 1, when a failure of the node impacts the edge node in the column.

Figures 8B, 9:
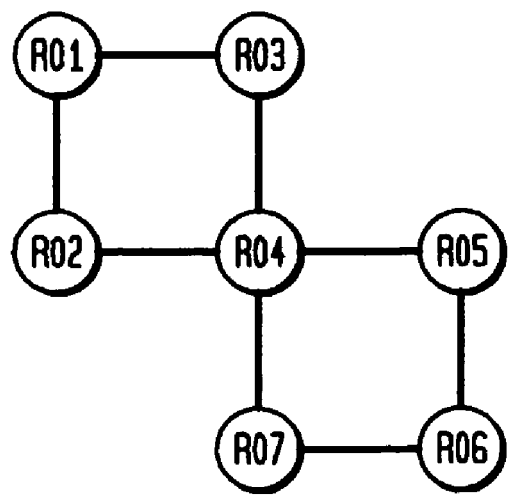

FIG. 8B illustrates the reduction of the codebook shown in FIG. 8A in accordance with the principles of the invention. In the n-LNH model, any edge node can be eliminated in the reduced codebook.

As would be recognized, when an edge node is eliminated in the n-LNH model, it is almost equivalent to having all the application connections adjacent to the edge node eliminated in the LNH model. Accordingly, the reduction of the n-LNH model can be seen as one method to add a constraint to eliminate all connections adjacent to the same eliminated node in the codebook reduction of the corresponding LNH model. More specifically, if a connection is eliminated because it is adjacent to a failed node, then all the connections adjacent to the same node can be eliminated as well.

The solution space for the n-LNH model may be smaller than that of the corresponding LNH model, but there are practical advantages to the n-LNH model as no monitors need be placed in the eliminated edge nodes. This is contrary to the original LNH, wherein monitors were not needed for all connections, but monitors are needed in most edge nodes to monitor some subset of connections.

As with the LNH model, a probabilistic version of the n-LNH model may be formulated to include probabilities of impact in each cell of the codebook. As an example, function $f^*$ may be defined for the sample p-LNH model to fill the cells of the model representation. Such a function $f^*$ may be represented as:

1. If $d(n, n1) > r$, then $f^*(p, n, n1) = 0$.

2. If $d(n, n1) \leq r$, then $f^*(p, n, n1) = \exp(p, d(n, n1))$.

where d( . . . ) represents a distance between nodes, and r is a radius or number of hops from the impacted node.

In this case, the probability value, p may be further generalized as a function of a connection (n1, n2), rather than a single node, and node n, as is more fully described with regard to FIG. 14B.

In accordance with another aspect of the invention, the LNH model may be further enhanced with information about structural constraints in the graph that represents the network. An example of a significant structural constraint may be referred to as a "cut node" in the model representation. A cut node is a node that, when removed, will break or partition the graph into two or more partitions containing connected components. A model that takes into account graph cuts is referred to herein as c-LNH.

With reference to FIG. 9, which is a graphic representation 900 of a second exemplary network, node R04 represents a cut node. The removal or failure in node R04 partitions the graph 900 into two partitions; one containing nodes R1, R2, and R3; and the other containing nodes R5, R6, and R7. A failure of a cut node or a node adjacent to a cut edge impacts all application connections between a node of one partition and a node of another partition, created by the failed node. For example, failure of node R04, in FIG. 9, impacts the connection between node R1 and node R6. Such failures can be explicitly modeled by representing the impact caused by a failure of each cut node on the relevant application connections between the partitions. The identification of cut nodes and cut edges (in graphs) can be performed with well known algorithms such as described in *The Design and Analysis of Computer Algorithms* by Alfred V. Aho, John E. Hoperoft, and Jeffrey D. Ullman, Addison-Wesley Pub Co (1974) ISBN: 0201000296.

In one aspect of the invention, a c-LNH model may be determined by the exemplary process shown and described with regard to FIG. 15A. FIG. 10 illustrates an example of a codebook for the graphic representation shown in FIG. 9, with the impact due to failure in cut node R04 added. That is, an indication, i.e., 1, is included in row associated with node R04, and column (R01, R06) to consider the impact of a failure in node R04. In addition, the method shown in FIG. 15A for generating a c-LNH model may be extended with a probabilistic approach similar to the p-LNH process described in FIG. 14B. The extension of a c-LNH model representation, referred to herein as cp-LNH, may be determined by the exemplary process shown and described with regard to FIG. 15B.

The impact of the failure of a cut node or node adjacent to a cut edge is to affect the partitioned application connections with probability of a known certainty. As would be recognized, a function $f$ may be determined similar to that shown with regard to the p-LNH process, wherein function $f$ may be generalized to be a function of (n1, n2), n, and p.

In accordance with the principles of the invention, an extension to the cut node approach further provides for all the possible routes between any two nodes n1 and n2 in the graph and assigns to each a probability of being the actual route followed by the respective application connection (n1, n2). There are several possible realizations of this general extension, for which an exemplary process is described and referred to herein, as the Structure of the Graph (SG) Model.

In this embodiment, nodes can be considered to impact application connections with a probability proportional to the number of times they appear in routes that service the given connection. For example, if a node appears in 2 out of 4 routes, then the impact has probability 50%. If the node appears in every route, then the impact probability is 100%.

An extension of the cp-LNH model representation incorporating an SG model may be determined by the exemplary process shown and described with regard to FIG. 16.

Figure 12A:
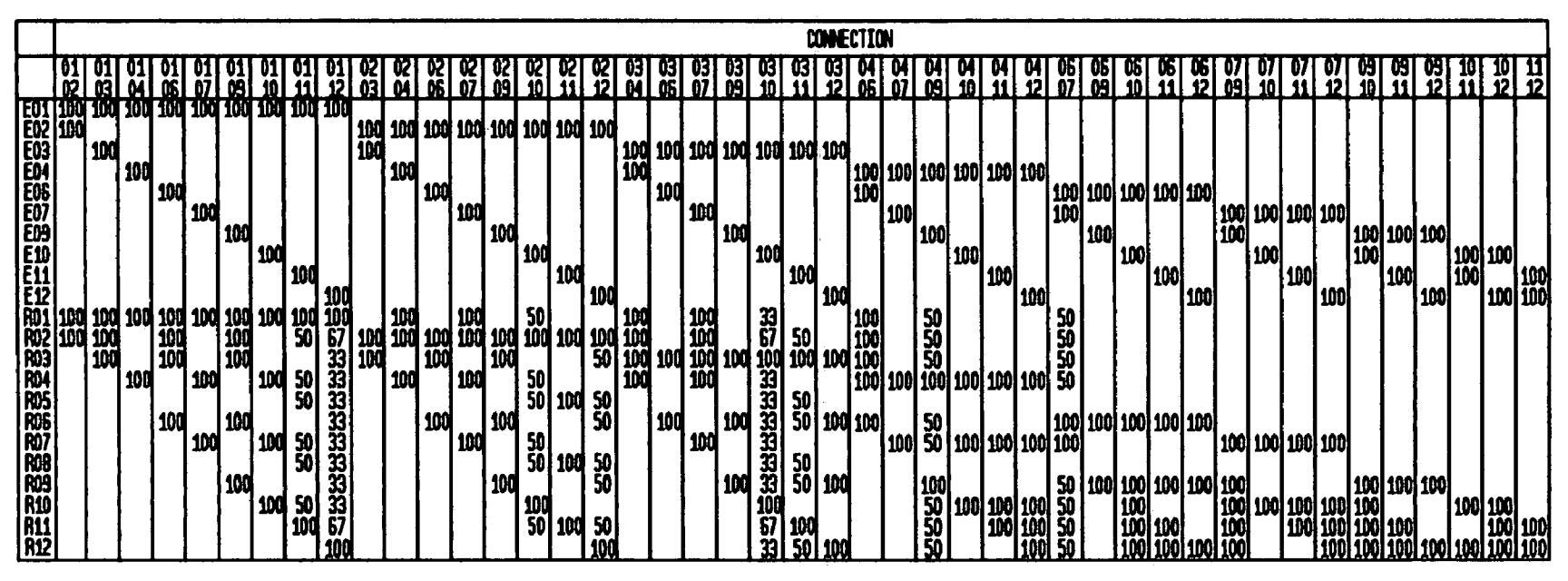
Figure 12B:
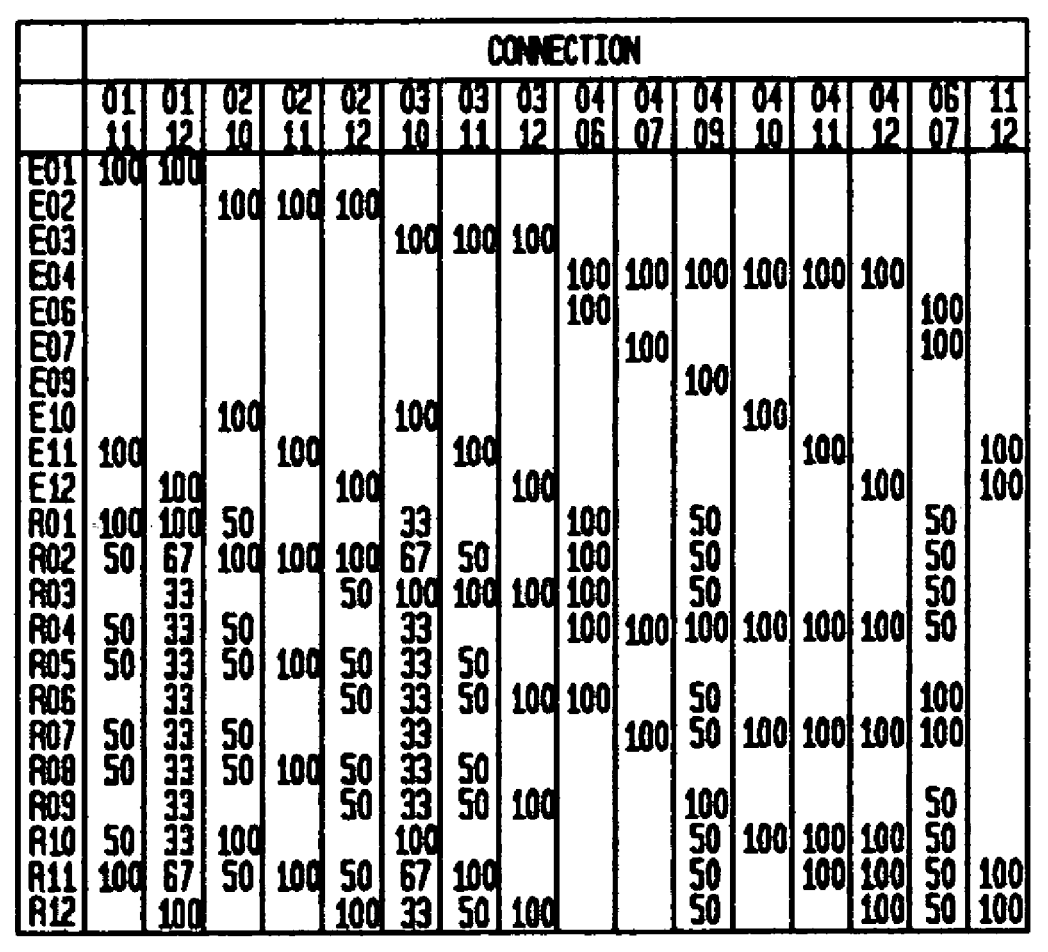

FIGS. 11A and 12A illustrate mapping representations (codebook) of causing events and detected events for the networks shown in FIGS. 9 and 2, respectively. FIGS. 11B and 12B illustrate the reduction of the illustrated mapping representations shown in FIGS. 11A and 12A in accordance with the principles of the invention, which has been described previously. With regard to FIG. 11B, for example, monitors need be placed in nodes 01, 03, 05 and 06 to substantially identify the event causing one or more symptoms detected.

Determination of Causality Mapping

FIG. 13A illustrates an exemplary process, expressed in pseudo-code, for generating the FR mapping (mode)l representation shown in FIG. 5A. In this illustrated process, each node is tested against each connection between nodes and when the tested node is contained within the connection, an indication is made in the column associated with the connection. In this case, the indication represents a fixed value, i.e., 1.

FIG. 13B illustrates an exemplary process, expressed in pseudo-code, for generating p-FR model representation. Similar to the processing shown in FIG. 13A, each node is tested against each connection between nodes and when the node is contained within the connection, an indication is made in the entry (column) associated with the connection. In this case, the indication represents a probability value.

As would be recognized, the value contained may be a function of the nodes n1, n2 and node n, and, hence, may be different for each combination of nodes and connectivity. For example, the probability value may be generalized to a function of (n1, n2), p and n, rather than a constant value between nodes n1 and n2. One example of a function $f$ that defines the values in each cell of the codebook may be more formally stated as:

1. a node failure will impact its neighbor with probability p.
2. for a node n, a connection (n1, n2) and a radius r, $f$ can be defined as follows: Let d(x, y) be the distance in hops between x and y.

1. If $d(n, n1) > r$ and $d(n, n2) > r$, then $f(p, n, n1, n2) = 0$.

2. If $d(n, n1) \leq r$ and $d(n, n2) > r$, then $f(p, n, n1, n2) = \exp(p, d(n, n1))$.

3. If $d(n, n1) > r$ and $d(n, n2) \leq r$, then $f(p, n, n1, n2) = \exp(p, d(n, n2))$.

4. If $d(n, n1) \leq r$ and $d(n, n2) \leq r$, then $f(p, n, n1, n2) = 1 - (1 - \exp(p, d(n, n1)))(1 - \exp(p, d(n, n2)))$.

An exemplary function exp (x, y) may be represented as $x^y$.

In another aspect of the invention, the function $f$ may be specified to create a higher probability when node n is closer to node n1 or n2 as:

$f(p, n, n1, n2) = g(p, \min\{d(n, n1), d(n, n2)\})$, where g is a known function.

For example, $f(p, n, n1, n2) = p/\min\{d(n, n1), d(n, n2)\}$, which will create a higher probability of impact of a node n the closer n is to n1 or n2.

In still another aspect of the invention, the function $f$ may be specified as:

$f(p, n, n1, n2) = h(p, d(n, n1) + d(n, n2))$, where h( . . . ) is a known function.

For example, $f(p, n1, n2) = p/(d(n, n1) + d(n, n2))$ will produce a greater probability of impact of a node n the closer n is to both n1 and n2.

FIG. 14A illustrates an exemplary process, expressed in pseudo-code, for generating the LNH model representation shown in FIG. 6A. In this case, each node is tested against each connection (n1, n2) and when a selected node is within a known number of radius or distance, i.e., nodes hops, from either node n1 or n2, an indication is made in the entry (column) representing the associated connection. In this case, the indication represents a fixed value.

FIG. 14B illustrates an exemplary process, expressed in pseudo-code, for generating the p-LNH model representation shown in FIG. 7A. Similar to the processing shown in FIG. 14A, each node is tested against each connection (n1, n2) and when the node is within a known number of hops from either node n1 or n2, an indication is made in the entry (column) representing the associated connection. In this case, the indication represents a probability value. As would be recognized, the probability value used may be different for each combination of node n1, n2 and node n, and may be similarly represented as described with regard to the p-FR model shown in FIG. 13B.

FIG. 15A illustrates an exemplary process, expressed in pseudo-code, for generating a c-LNH model representation. As shown in, this exemplary process is similar to that shown in FIG. 14A with the addition of Step 3 that provides processing with regard to cut nodes. In this exemplary process, for every identified cut node n, a further determination is may whether in the entry representing the connections (n1, n2) and the end nodes n1 and n2 of the connection lie in different partitions of the graph if the node n where eliminated.

FIG. 15B illustrates an exemplary process, expressed in pseudo-code, for generating the pc-LNH model representation and is similar to the process shown in FIG. 15A. In this case, the indication set in each entry representing the connectivity represents a probability value. As would be recognized, the value used as an indication may be different fro each combination of node n1, n2 and node n and may be determined in a manner similar to that described with regard to FIG. 13B FIG. 16 illustrates an exemplary process, expressed in pseudo-code, for generating the pc-LNH-SG model representation shown in FIGS. 11A and 12A. This exemplary process is advantageous in finding all sets of routes between nodes (n1, n2) with a given property (e.g., the size should be at most k). It then computes the frequency fr that a node n appears in the identified routes between n1 and n2. The probability assigned to the node pair (n1, n2), node n is determined by the function $f$, which is similar to that described with regard to FIG. 13B.

As would be recognized, the routes R(n1, n2) may be computed using any algorithm or selected by some criterion. For example, the routes selected may be all shortest path routes, or some given number of routes selected by a network manager, etc. Determination of all shortest paths is more fully described with regard to the modified short path algorithm.

The function, g(n1, n2), may, for example, represent the number of all routes in R(n1, n2) of size k, i.e., g(n1, n2, k), and expressed as:

$$g(n1, n2) = \sum_{k=0}^{\infty} g(n1, n2, k)$$

Similarly, the function c(n1, n2) may, for example, represent the number of times that node n appears in all routes in R(n1, n2) of size k, i.e., c(n1, n2, n, k), and expressed as:

$$c(n1, n2, n) = \sum_{k=0}^{\infty} c(n1, n2, n, k)$$

In one exemplary aspect, function h(n1, n2, n) may be expressed as a function of h(n1, n2, n, k) such as:

$$h(n1, n2, n) = \sum_{k=0}^{\infty} h(n1, n2, n, k).$$

In a second example, function may be determined as $h(n1, n2, n) = c(n1, n2, n)/g(n1, n2)$ if $g(n1, n2) > 0$: and $h(n1, n2, n) = 0$ otherwise.

In this second example, function h( . . . ), represents the average number of paths in R(n1, n2) of any size k that contains node n. Hence, h( . . . ) may approximate the probability of n impacting the connection (n1, n2)).

More broadly, instead of the frequency fr, one may compute any other probability function h relating the number of occurrences of n in paths between n1 and n2. In this case, the indication represents a probability value. As would be recognized, the value used as an indication may be different for each combination of node n1, n2 and node n.|

In one aspect of the invention and with reference to step 2.b.iv shown in FIG. 16, the function h(n1, n2, n) may be expressed as:

$h(n1, n2, n) = 1$ if $c(n1, n2, n) > 0$ and $h(n1, n2, n) = 0$ otherwise.

In this case, the impact of a node n failure is always 100% if it participates in any path of the connection (n1, n2), independent of the number of paths between the edge nodes. This approximate model is advantageous as it work very well and is simpler to implement.

In another aspect of the invention and with reference to step 2.b.i. of FIG. 16, the set of routes R(n1, n2) for all pairs (n1, n2) may include only the ones with shortest paths and function h is the same defined as above. In this case, all the shortest path routes may be found using a modification of the shortest path algorithm described in *The Design and Analysis of Computer Algorithms*. Id.

The modified shortest path algorithm in accordance with the principles of the invention may be expressed, in pseudo code, as:

Let C be a matrix representing the graph G such that:

$C(i, i) = 0$;

$C(i, j) = 1$ if $G$ contains the edge $(i, j)$, $i \neq j$; and $C(i, j) = $ infinity if $G$ does not contain edge $(i, j)$, $i \neq j$.

The modified shortest path may be determined as:

```
cost (G) {
  For every node i in G
    For every node j in G
```
```
      Initialize P(i, j) with the empty list {}
      For every node i in G
        For every node j in G
          For every node k in G
            If(C(i, k) + C(k, j) ≤ C(i, j))
              Then inset k in P(i, j)
}
```

The result is the minimum cost value in matrix C and the list of intermediary nodes providing shortest paths in matrix P.

All shortest paths between two nodes i and j of G may now be determined as:

```
sp (i, j) {
  For every node k in P(i, j)
    For every path p1 in sp (i, k)
      For every path p2 in sp (k, j)
        If path p formed by p1 concatenated with {k}
          concatenated with p2 is not in R(i, j)
            Insert p in R(i, j)
}
```

The list of all shortest paths will result in R(i, j).

In still another aspect of the invention, the routes R(n1, n2) may include all the shortest path routes plus all the path containing up to x more hops relative to the shortest paths, where x is a known number. That is, if the shortest path between n1 and n2 has size s(n1, n2), then all paths of size up to s(n1, n2)+x may be considered. In this case, the function h(n1, n2, n k) in step 2.b.iii may be represented as:

$h(n1, n2, n, s(n1, n2)+k) = 1/(k+1)$, if n is in a path (n1, n2) of size s(n1, n2)+k, k 23 x; and $h(n1, n2, n, k) = 0$, otherwise.

Function h reflects the impact of node n on the (n1, n2) application connection by taking the maximum impact of n on paths of size s(n1, n2), s(n1, n2)+1, . . . , x may then be determined as:

$h(n1, n2, n) = \max_k h(n1, n2, n, k)$.

As would be appreciated, dynamic changes to the target system may change the objects relationships, events, and symptoms in the model of the distributed system. In case of changes to the distributed system, the processing shown herein may be executed only for the changed elements. For example, if a node is inserted in the network, then it may be the source of new events and symptoms. The node, relationships, events, and symptoms may be added to an existing graph representation and model. The changes to the model that relates the events with the symptoms can be individually added.

In one aspect of the invention, only a partial topology (components and links) of the distributed system may be known. The transformation of the topology into the graph G in Step 10 (FIG. 1) may be adjusted to incorporate additional information regarding the system. For example:

1. an approximation of the model may be made by assuming some nodes and links of the original topology are known. The original topology may be approximated with a new topology that takes into account only the known components. The graph G can be generated from the approximate topology; or 2. unknown regions of the topology are grouped using an artificial node of the modeled system. The artificial node is connected to all nodes of the topology adjacent to the unknown region. The new topology with the artificial nodes is mapped into the graph G; or 3. dynamic changes to the network may be accommodated by appropriate modification or amendment to an existing model configuration rather than re-formulating the model without consideration of the existing model.

Figure 17:
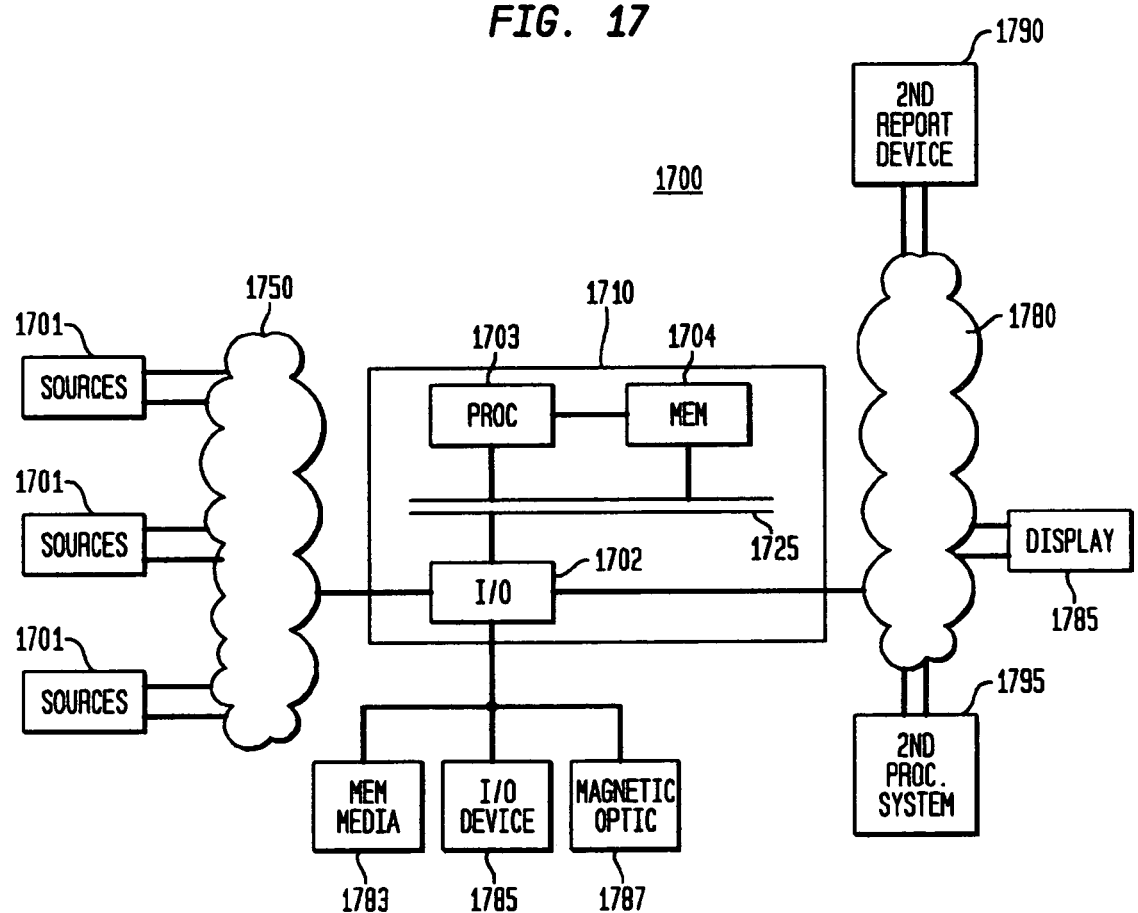
FIG. 17 illustrates a system for implementing the processing shown herein.

FIG. 17 illustrates an exemplary embodiment of a system or apparatus 1700 that may be used for implementing the principles of the present invention. System 1700 includes processing unit 1710 that may contain one or more input/output devices 1702, processors 1703 and memories 1704. I/O devices 1702 may access or receive information from one or more sources or devices 1701. Sources or devices 1701 may be devices such as routers, servers, computers, notebook computer, PDAs, cells phones or other devices suitable for transmitting and receiving information responsive to the processes shown herein. Devices 1701 may have access over one or more network connections 1750 via, for example, a wireless wide area network, a wireless metropolitan area network, a wireless local area network, a terrestrial broadcast system (Radio, TV), a satellite network, a cell phone or a wireless telephone network, or similar wired public networks, such as POTS, INTERNET, LAN, WAN and/or private networks, e.g., INTRANET, as well as portions or combinations of these and other types of networks. Network 1750 may similarly represent a communication bus, such as PCI, USB, Firewire, etc.

Input/output devices 1702, processors 1703 and memories 1704 may communicate over a communication medium 1725. Communication medium 1725 may represent, for example, a bus, a communication network, one or more internal connections of a circuit, circuit card or other apparatus, as well as portions and combinations of these and other communication media. Input data from the devices 1701 is processed in accordance with one or more programs that may be stored in memories 1704 and executed by processors 1703. Memory 1704 may be selected preferably from semiconductor memories such as a Read-Only Memory (ROM), a Programmable ROM, a Random Access Memory, which is accessible through medium 1725 or may be a cache memory in direct communication with processors 1703. Processors 1703 may be any means, such as general purpose or special purpose computing system, such as a laptop computer, desktop computer, a server, handheld computer, or may be a hardware configuration, such as dedicated logic circuit, or integrated circuit. Processors 1703 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In a one aspect, the processes shown herein may be represented by computer readable code stored on a computer readable medium. The code may also be stored in the memory 1704. The code may be read or downloaded from a memory medium 1783, an I/O device 1785 or magnetic or optical media, such as a floppy disk, a CD-ROM or a DVD, 1787, or over one or more networks, e.g., 1750, 1780, etc. The downloaded computer readable code may be stored in memory 1704 or executed directly by processor 1703. Further it would be understood that the code may be processor specific or processor non-specific. Code written in the Java programming language is an example of processor non-specific code. Java is a trademark of the Sun Microsystems Corporation.

Information from device 1701 received by I/O device 1702, after processing in accordance with one or more software programs operable to perform the functions illustrated herein, may also be transmitted over network 1780 to one or more output devices represented as display 1792, reporting device 1790, e.g., printer, or second processing system 1795. As would be recognized, network 1780 may be physically the same as network 1750 or may be a different network that operates on the same or different communication principles as that of network 1750. Similarly, networks 1750, 1780 and bus 1725 may be the same or different entities.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. For example, although the present invention has been described with regard to a connectivity between two nodes, n1 and n2, it would be recognized that the present invention is also applicable to other types of distribution systems. For example, a multi-cast distributed system provides connectivity between single nodes n1 and each of nodes n2, n3, etc. Hence, detectable events are associated with a subset of nodes. It would thus be recognized that the examples described herein represent the subset n1 and n2.

It is expressly intended that all combinations of those elements that perform substantially the same function in substantially the same way to achieve the same results are within the scope of the invention. Substitutions of elements from one described embodiment to another are also fully intended and contemplated. Furthermore, while the distributed systems described herein with regard to computer network systems and software applications, it would be recognized that the method and system described may be applied, but are not limited, to distributed systems such as telecommunication networks, distributed application systems (e.g., transaction systems, web services, databases, application systems), active network based systems, sensor systems, satellite systems, biological systems, financial systems, software applications and other systems built of components connected by relationships where events propagate through the components or relationships.

What is claimed is:

1. A method for determining locations of at least one monitoring entity for detecting detectable events among a plurality of nodes in a distributed system, the method comprising the steps of: automatically generating a causality mapping model of the dependences between causing events at the nodes of the distributed system and the detectable events associated with a subset of the nodes, the model suitable for representing the execution of at least one system operation; reducing the number of detectable events in the model, wherein the reduced number of detectable events is suitable for substantially representing the execution of the at least one system operation; and placing at least one of the at least one monitoring entities at selected ones of the nodes associated with the detectable events in the reduced model.

2. The method as recited in claim 1, wherein the step of generating the model comprises the steps of: selecting nodes associated with each of the detectable events from the subset of the nodes; and indicating the dependency between causing events and each of the detectable events for each causing event at a node when the causing event node is in one of the routes between the selected nodes.

3. The method as recited in claim 1, wherein the step of generating the model comprises the step of: selecting nodes associated with each of the detectable events from the subset of the nodes; and indicating the dependency between a causing event and at least one detectable event for each causing event at a node when the causing event node is a known distance from at least one node selected from the selected nodes.

4. The method as recited in claim 1, wherein the step of generating the model comprises the steps of: selecting nodes associated with each of the detectable events from the subset of the nodes; and indicating the dependency between a causing event and at least one detectable event for each causing event at a node when the causing event node divides the system into a plurality of disjoint partitions and at least one of the nodes associated with a selected detectable event is contained in one of the disjoint partitions and at least one other of the nodes associated with the selected detectable event is contained in another one of the disjoint partitions.

5. The method as recited in claim 3, wherein the step of generating the model further comprises the steps of: indicating the dependency between a causing event and at least one detectable event for each causing event at a node when the causing event node divides the system into a plurality of disjoint partitions and at least one of the nodes associated with a selected detectable event is contained in one of the disjoint partitions and at least one other of the nodes associated with the selected detectable event is contained in another one of the disjoint partitions.

6. The method as recited in claim 1, wherein the step of generating the model comprises the steps of: selecting nodes associated with each of the detectable events from the subset of the nodes; and indicating the dependency between a causing event and at least one detectable event for each causing event at a node when the causing event node is a known distance from at least one node associated with the detectable event, wherein the dependency is a function of the number of times the causing event node appears in the routes between the nodes.

7. The method as recited in claim 1, wherein the system operation is selected from the group consisting of: fault detection, fault monitoring, performance, congestion, connectivity, interface failure, node failure, link failure, routing protocol error, routing control errors, and root-cause analysis.

8. The method as recited in claim 1, wherein the step of reducing comprises the step of: eliminating substantially similar information from the model by the steps of: determining a measure for each causing event; determining a mismatch measure between each of the causing events; and retaining the detectable events associated with the smallest mismatch measure.

9. The method as recited in claim 1, wherein the dependency represents a probability a detected event was caused by a causing event.

10. The method as recited in claim 9, wherein the probability decreases as a function of the number nodes from the causing event node.

11. The method as recited in claim 1, wherein the dependency is a predetermined value.

12. The method as recited in claim 1, wherein model is selected from the group consisting of: a causality matrix and causality graph.

13. The method as recited in claim 1, wherein the routes between nodes selected from the subset of nodes represents the shortest paths.

14. The method as recited in claim 1, wherein the dependency is a measure of the number of times a causing event node appears in the total number of routes between the nodes selected from the subset of nodes.

15. An apparatus for determining locations of at least one monitoring entity among a plurality of nodes in a distributed system, the apparatus comprising: a processor in communication with a memory, the processor executing code for: automatically generating a causality mapping model of the dependences between causing events at the nodes of the distributed system and the detectable events associated with a subset of the nodes, the model suitable for representing the execution of at least one system operation; reducing the number of detectable events in the model, wherein the reduced number of detectable events is suitable for substantially representing the execution of the at least one system operation; and placing at least one of the at least one monitoring entities at selected ones of the nodes associated with the detectable events in the reduced model.

16. The apparatus as recited in claim 15, the processor further executing code for generating the model comprising: selecting nodes associated with each of the detectable events from the subset of the nodes; and indicating the dependency between a causing event and at least one detectable event for each causing event at a node when the node is in one of the routes between the subset of nodes.

17. The apparatus as recited in claim 15, the processor further executing code for generating the model comprising: selecting nodes associated with each of the detectable events from the subset of the nodes; and indicating the dependency between a causing event and at least one detectable event for each causing event at a node when the node is a known distance from at least one node selected from the subset of nodes.

18. The apparatus as recited in claim 15, wherein the processor further executing code for generating the model comprising: selecting nodes associated with each of the detectable events from the subset of the nodes; and indicating the dependency between a causing event and at least one detectable event for each causing event at a node when the causing event node divides the system into a plurality of disjoint partitions and at least one of the nodes associated with a selected detectable event is contained in one of the disjoint partitions and at least one other of the nodes associated with the selected detectable event is contained in another one of the disjoint partitions.

19. The apparatus as recited in claim 16, wherein the processor further executing code for generating the model comprising: indicating the dependency for each causing event at a node when the causing event node divides the system into a plurality of disjoint partitions and at least one of the nodes associated with a selected detectable event is contained in one of the disjoint partitions and at least one other of the nodes associated with the selected detectable event is contained in another one of the disjoint partitions.

20. The apparatus as recited in claim 15, the processor further executing code for generating the model comprising: selecting nodes associated with each of the detectable events from the subset of the nodes; and indicating the dependency between a causing event and at least one detectable event for each causing event at a node when the node is a known distance from at least one node selected from the subset of nodes, wherein the dependency is a function of the number of times the causing event node appears in the routes between the nodes selected from the subset of nodes.

21. The apparatus as recited in claim 15, wherein the system operation is selected from the group consisting of: fault detection, fault monitoring, interface failure, node failure, link failure, routing protocol error, routing control errors, and root-cause analysis.

22. The apparatus as recited in claim 15, the processor further executing code for reducing the model comprising: eliminating redundant information from the model, comprising the steps of: determining a measure for each causing event; determining a mismatch measure between each of the causing events; and retaining the detectable events associated with the smallest mismatch measure.

23. The apparatus as recited in claim 15, wherein the dependency represents a probability a detected event was caused by a causing event.

24. The apparatus as recited in claim 23, wherein the probability decreases as a function of the number nodes from the causing event node.

25. The apparatus as recited in claim 15, wherein the indication is a predetermined value.

26. The apparatus as recited in claim 15, wherein model is selected from the group consisting of: a causality matrix and causality graph.

27. The apparatus as recited in claim 15, wherein the path between nodes selected from the subset of nodes represents the shortest paths.

28. The apparatus as recited in claim 15, wherein the dependency is a measure of the number of times a causing event node appears in the total number of paths between the nodes selected from the subset of nodes.

29. A computer-readable medium containing code for determining locations of at least one monitoring entity for detecting detectable events among a plurality of nodes in a distributed system the code providing instruction to a processing system for executing code for:
   automatically generating a causality mapping model of the dependences between causing events at the nodes of the distributed system and the detectable events associated with a subset of the nodes, the model suitable for representing the execution of at least one system operation;
   reducing the number of detectable events in the model, wherein the reduced number of detectable events is suitable for substantially representing the execution of the at least one system operation; and placing at least one of the at least one monitoring entities at selected ones of the nodes associated with the detectable events in the reduced model.

30. The computer-readable medium as recited in claim 29, the code providing instruction to the processing system for generating the model comprising: selecting nodes associated with each of the detectable events from the subset of the nodes; and indicating the dependency between a causing event and at least one detectable event for each causing event at a node when the node is in one of the routes between the selected nodes.

31. The computer-readable medium as recited in claim 29, the code providing instruction to the processing system for generating the model comprising: selecting nodes associated with each of the detectable events from the subset of the nodes; and indicating the dependency between a causing event and at least one detectable event for each causing event at a node when the node is a known distance from at least one node selected from the subset of nodes.

32. The computer-readable medium as recited in claim 29, the code providing instruction to the processing system for generating the model comprising: selecting nodes associated with each of the detectable events from the subset of the nodes; and indicating the dependency between a causing event and at least one detectable event for each causing event at a node when the causing event node divides the system into a plurality of disjoint partitions and at least one of the nodes associated with a selected detectable event is contained in one of the disjoint partitions and at least one other of the nodes associated with the selected detectable event is contained in another one of the disjoint partitions.

33. The computer-readable medium as recited in claim 31, the code providing instruction to the processing system for generating the model comprising: indicating the dependency between a causing event and at least one detectable event for each causing event at a node when the causing event node divides the system into a plurality of disjoint partitions and at least one of the nodes associated with a selected detectable event is contained in one of the disjoint partitions and at least one other of the nodes associated with the selected detectable event is contained in another one of the disjoint partitions.

34. The computer-readable medium as recited in claim 29, the code providing instruction to the processing system for generating the model comprising: selecting nodes associated with each of the detectable events from the subset of the nodes; and indicating the dependency between a causing event and at least one detectable event for each causing event at a node when the node is a known distance from at least one node selected from the subset of nodes, wherein the dependency is a function of the number of times the causing event node appears in the routes between the nodes selected from the subset of nodes.

35. The computer-readable medium as recited in claim 29, wherein the system operation is selected from the group consisting of fault detection, fault monitoring, failure, node failure, link failure, routing protocol error, routing control errors, and root-cause analysis.

36. The computer-readable medium as recited in claim 29, the code providing instruction to the processing system for reducing the model comprising: eliminating redundant information from the model, comprising the step of: eliminating substantially similar information from the model by the steps of: determining a measure for each causing event; determining a mismatch measure between each of the causing events; and retaining the detectable events associated with the smallest mismatch measure.

37. The computer-readable medium as recited in claim 29, wherein the dependency represents a probability a detected event was caused by a causing event.

38. The computer-readable medium as recited in claim 29, wherein the probability decreases as a function of the number nodes from the causing event node.

39. The computer-readable medium as recited in claim 29, wherein the dependency is a predetermined value.

40. The computer-readable medium as recited in claim 29, wherein model is selected from the group consisting of: a causality matrix and causality graph.

41. The computer-readable medium as recited in claim 29, wherein the path between nodes selected from the subset of nodes represents the shortest paths.

42. The computer-readable medium as recited in claim 29, wherein the dependency is a measure of the number of times a causing event node appears in the total number of paths between the nodes selected from the subset of nodes.

* * * * *